US011167773B2

(12) United States Patent
Mimura

(10) Patent No.: US 11,167,773 B2
(45) Date of Patent: Nov. 9, 2021

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventor: Yoshitaka Mimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 582 days.

(21) Appl. No.: 16/080,375

(22) PCT Filed: Mar. 16, 2016

(86) PCT No.: PCT/JP2016/058342
§ 371 (c)(1),
(2) Date: Aug. 28, 2018

(87) PCT Pub. No.: WO2017/158764
PCT Pub. Date: Sep. 21, 2017

(65) Prior Publication Data
US 2021/0197845 A1   Jul. 1, 2021

(51) Int. Cl.
*B60W 50/14* (2020.01)
*B60W 60/00* (2020.01)
(Continued)

(52) U.S. Cl.
CPC ............ *B60W 50/14* (2013.01); *B60K 35/00* (2013.01); *B60W 10/04* (2013.01); *B60W 10/20* (2013.01);
(Continued)

(58) Field of Classification Search
CPC ...... B60W 50/14; B60W 10/20; B60W 10/04; B60W 60/005; B60W 2710/20;
(Continued)

(56) References Cited

U.S. PATENT DOCUMENTS 10,324,463 B1 * 6/2019 Konrardy ........... G01C 21/3407
2015/0274178 A1   10/2015 Tsuyunashi et al.
2016/0200317 A1 * 7/2016 Danzl ................... B60W 10/10
701/25

FOREIGN PATENT DOCUMENTS

CN   104670110   6/2015
CN   104925064   9/2015
(Continued)

OTHER PUBLICATIONS

Chinese Office Action for Chinese Patent Application No. 201680082641.3 dated Sep. 23, 2020.
(Continued)

*Primary Examiner* — Richard M Camby
(74) *Attorney, Agent, or Firm* — Amin, Turocy & Watson, LLP

(57) ABSTRACT

Provided is a vehicle control system including: an automatic driving control unit that automatically controls at least one of acceleration/deceleration and steering of a host vehicle, and performs automatic driving control in any one mode among a plurality of modes different in the degree of automatic driving; an interface device that accepts an operation by an occupant of the host vehicle and outputs information; and an interface control unit that restricts acceptance of the operation by the occupant of the host vehicle with respect to the interface device, or output of the information in the interface device in correspondence with a mode of automatic driving that is performed by the automatic driving control unit. In a case where information to be given in notification from the host vehicle to the occupant is generated, the interface control unit allows an interface device, for which the restriction is mitigated or released along with changing of the mode of the automatic driving, to output the information to be given in notification.

11 Claims, 19 Drawing Sheets

(51) Int. Cl.
*B60K 35/00* (2006.01)
*B60W 10/04* (2006.01)
*B60W 10/20* (2006.01)

(52) U.S. Cl.
CPC ..... *B60W 60/005* (2020.02); *B60K 2370/166* (2019.05); *B60K 2370/175* (2019.05); *B60K 2370/195* (2019.05); *B60K 2370/21* (2019.05); *B60K 2370/52* (2019.05); *B60K 2370/736* (2019.05); *B60W 2420/42* (2013.01); *B60W 2540/225* (2020.02); *B60W 2710/20* (2013.01); *B60W 2720/106* (2013.01)

(58) Field of Classification Search
CPC ....... B60W 2720/106; B60W 2420/42; B60W 2540/225; B60K 35/00; B60K 2370/195; B60K 2370/736; B60K 2370/21; B60K 2370/175; B60K 2370/166; B60K 2370/52
See application file for complete search history.

(56) References Cited

FOREIGN PATENT DOCUMENTS

| | | |
|---|---|---|
| DE | 10005581 | 10/2000 |
| DE | 102013018966 | 5/2015 |
| EP | 2942765 | 11/2015 |
| JP | 07-329657 | 12/1995 |
| JP | 2005-236969 | 9/2005 |
| JP | 2006-185415 | 7/2006 |
| JP | 2008-137521 | 6/2008 |
| JP | 2009-298201 | 12/2009 |
| JP | 2011-223511 | 11/2011 |
| JP | 2015-182624 | 10/2015 |
| JP | 2015-217798 | 12/2015 |
| JP | 2016-018238 | 2/2016 |
| WO | 2015/071035 | 5/2015 |
| WO | 2015/162764 | 10/2015 |

OTHER PUBLICATIONS

Japanese Office Action for Japanese Patent Application No. 2018-505139 dated Jul. 30, 2019.
International Search Report and Written Opinion for International Patent Application No. PCT/JP2016/058342 dated Jun. 7, 2016, 9 pages.

* cited by examiner

FIG. 12

188 MODE-SPECIFIC OPERATION AVAILABILITY INFORMATION

| DRIVING MODE <br> NON-DRIVING <br> OPERATION SYSTEM | MANUAL DRIVING MODE | AUTOMATIC DRIVING MODE | | | ... |
| --- | --- | --- | --- | --- | --- |
| | | FIRST MODE | SECOND MODE | THIRD MODE | |
| NAVIGATION OPERATION | NOT-AVAILABLE | AVAILABLE | AVAILABLE | NOT-AVAILABLE | ... |
| CONTENT REGENERATION OPERATION | NOT-AVAILABLE | AVAILABLE | NOT-AVAILABLE | NOT-AVAILABLE | ... |
| INSTRUMENT PANEL OPERATION | NOT-AVAILABLE | AVAILABLE | AVAILABLE | AVAILABLE | ... |
| COMMUNICATION TERMINAL OPERATION | ONT-AVAILABLE | AVAILABLE | AVAILABLE | NOT-AVAILABLE | ... |
| ... | ... | ... | ... | ... | ... |

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

Recently, research on a technology of automatically controlling at least one of acceleration/deceleration, and steering of a host vehicle in order for the host vehicle to travel along a route to a destination (hereinafter, referred to as "automatic driving") has been in progress. In this regard, a driving mode control device including a notification unit that notifies an occupant of transition from automatic driving to manual driving is disclosed (for example, refer to Patent Literature 1).

CITATION LIST

Patent Literature

Patent Literature 1

Japanese Unexamined Patent Application, First Publication No. 2016-018238

SUMMARY OF INVENTION

Technical Problem

However, in the related art, a vehicle occupant is notified of a schedule to transition to a manual driving mode with specific means such as voice, and thus an appropriate notification may not be given to a device for which an operation by the vehicle occupant is restricted along with automatic driving control.

The invention has been made in consideration of such circumstances, and an object thereof is to provide a vehicle control system, a vehicle control method, and a vehicle control program which are capable of enhancing convenience by transmitting information of a device that can be used during automatic driving control to a vehicle occupant.

Solution to Problem

According to a first aspect of the invention, there is provided a vehicle control system (100) including: an automatic driving control unit (120) that automatically controls at least one of acceleration/deceleration and steering of a host vehicle, and performs automatic driving control in any one mode among a plurality of modes different in the degree of automatic driving; an interface device (70) that accepts an operation by an occupant of the host vehicle and outputs information; and an interface control unit (174) that restricts acceptance of the operation by the occupant of the host vehicle with respect to the interface device, or output of the information in the interface device in correspondence with a mode of automatic driving that is performed by the automatic driving control unit. In a case where information to be given in notification from the host vehicle to the occupant is generated, the interface control unit allows an interface device, for which the restriction is mitigated or released along with changing of the mode of the automatic driving, to output the information to be given in notification.

According to a second aspect of the invention, in the vehicle control system according to the first aspect, the interface control unit may allow the interface device to output information indicating that use of the interface device is permitted along with changing of the mode of the automatic driving.

According to a third aspect of the invention, in the vehicle control system according to the first aspect, the interface control unit may restrict use of the interface device in manual driving or in automatic driving in which peripheral monitoring by the occupant is necessary, and release the restriction in automatic driving in which the peripheral monitoring by the occupant is not necessary.

According to a fourth aspect of the invention, in the vehicle control system according to the first aspect, the interface control unit may allow the interface device to output information including one or both of an event related to acceleration/deceleration and/or lane changing of the host vehicle, and a handover request with respect to the occupant of the host vehicle in the automatic driving control unit.

According to a fifth aspect of the invention, the vehicle control system according to the first aspect may further include: an imaging unit (95) that captures an image of a space inside the host vehicle; and a visual line detection unit (176) that detects a visual line direction of the occupant on the basis of the image captured by the imaging unit. The interface control unit may allow an interface device, which exists in the visual line direction of the occupant which is detected by the visual line detection unit, to output information.

According to a sixth aspect of the invention, in the vehicle control system according to the fifth aspect, in a case where an operation from the occupant is not accepted within a predetermined time after allowing the interface device, which exists in the visual line direction of the occupant which is detected by the visual line detection unit, to output the information, the interface control unit may allow an interface device other than the interface device allowed to output the information to output the information.

According to a seventh aspect of the invention, in the vehicle control system according to the first aspect, the interface device may include at least one among a navigation device (50), a display device (82), and a communication terminal (96).

According to an eighth aspect of the invention, the vehicle control system according to the first aspect may further include: an imaging unit that captures an image of a space inside the host vehicle; a visual line detection unit that detects a visual line of the occupant on the basis of the image captured by the imaging unit; and a projection unit (97) that projects an image to the space inside the host vehicle. The interface control unit may project information related to an interface device, for which the restriction is mitigated or released along with changing of the mode of the automatic driving that is performed by the automatic driving control unit, from the projection unit with respect to a visual line direction of the occupant which is detected by the visual line detection unit.

According to a ninth aspect of the invention, in the vehicle control system according to the eighth aspect, the interface control unit may acquire information of a target to which the information related to the automatic driving of the host vehicle is projected from an image captured by the imaging unit, and may set at least one among a color, a size, and movement of an image to be projected by the projection unit on the basis of the target that is acquired.

According to tenth aspect of the invention, in the vehicle control system according to the eighth aspect, the interface control unit may project information related to an interface device for which use by the occupant is permitted along with changing of the driving mode by the automatic driving control unit in the visual line direction of the occupant.

According to an eleventh aspect of the invention, there is a provided a vehicle control method that allows an in-vehicle computer to: automatically control at least one of acceleration/deceleration and steering of a host vehicle, and perform automatic driving control in any one mode among a plurality of modes different in the degree of automatic driving; accept an operation by an occupant of the host vehicle and allows an interface device to output information; restrict acceptance of the operation by the occupant of the host vehicle with respect to the interface device, or output of the information in the interface device in correspondence with a mode of automatic driving that is performed by the automatic driving control; and allow an interface device, for which the restriction is mitigated or released along with changing of the mode of the automatic driving, to output information to be given in notification in a case where the information to be given in notification from the host vehicle to the occupant is generated.

According to a twelfth aspect of the invention, there is provided a vehicle control program that allows an in-vehicle computer to execute: a process of automatically controlling at least one of acceleration/deceleration and steering of a host vehicle, and performing automatic driving control in any one mode among a plurality of modes different in the degree of automatic driving; a process of accepting an operation by an occupant of the host vehicle and allowing an interface device to output information; a process of restricting acceptance of the operation by the occupant of the host vehicle with respect to the interface device, or outputting of the information in the interface device in correspondence with a mode of automatic driving that is performed by the automatic driving control; and a process of allowing an interface device, for which the restriction is mitigated or released along with changing of the mode of the automatic driving, to output information to be given in notification in a case where the information to be given in notification from the host vehicle to the occupant is generated.

Advantageous Effects of Invention

According to the first to third aspects, the seventh aspect, the eighth aspect, and the tenth to twelfth aspects of the invention, for example, during release of restriction with respect to an interface device, notification from the host vehicle is given to an interface device which is highly likely to be visually recognized by an occupant, and thus the occupant is instantly aware of the notification. Accordingly, it is possible to enhance convenience of a device that is used in the host vehicle.

According to the fourth aspect of the invention, it is possible to easily acquire a behavior of the host vehicle according to the automatic driving control from the interface device.

According to the fifth aspect of the invention, output can be performed only to an interface device that is highly likely to be viewed by an occupant, and thus it is possible to more reliably transmit information to the occupant.

According to the sixth aspect of the invention, in a case where the occupant overlooks the information output from the interface device, the information is also output by another interface device, and thus it is possible to more reliably transmit information to the occupant.

According to the ninth aspect of the invention, it is possible to project an image that is likely to be visually recognized by the occupant.

BRIEF DESCRIPTION OF DRAWINGS

FIG. 12 is a view illustrating an example of mode-specific operation availability information 188.

DESCRIPTION OF EMBODIMENTS

Hereinafter, embodiments of a vehicle control system, a vehicle control method, and a vehicle control program of the invention will be described with reference to the accompanying drawings.

<Common Configuration>

Figure 1:
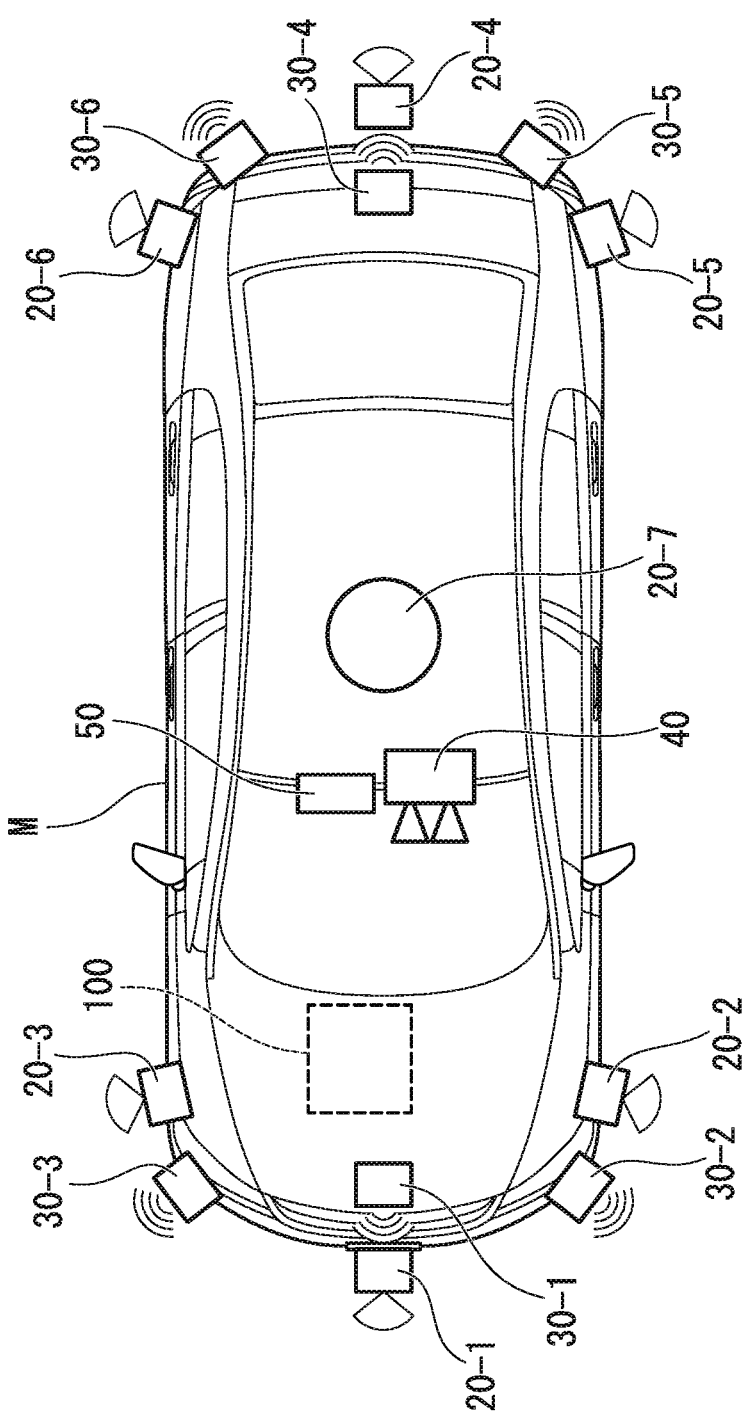
FIG. 1 is a view illustrating constituent elements of a vehicle in which a vehicle control system 100 of embodiments is mounted.

FIG. 1 is a view illustrating constituent elements of a vehicle (hereinafter, referred to as "host vehicle M") in which a vehicle control system 100 of the embodiments is mounted. For example, a vehicle in which the vehicle control system 100 is mounted is a two-wheeled vehicle, a three-wheeled vehicle, a four-wheeled vehicle, or the like, and may be a vehicle that uses an internal combustion engine such as a diesel engine and a gasoline engine as a power source, an electric vehicle that uses an electric motor as the power source, a hybrid vehicle including both the internal combustion engine and the electric motor, or the like. In addition, for example, the above-described electric vehicle is driven by using electric power that is discharged from a battery such as a secondary battery, a hydrogen fuel cell, a metallic fuel cell, and an alcohol fuel cell.

As illustrated in FIG. 1, sensors such as finders 20-1 to 20-7, radars 30-1 to 30-6, and a camera (imaging unit) 940, a navigation device (display unit) 50, and the vehicle control system 100 are mounted on the host vehicle M.

For example, the finders 20-1 to 20-7 are a light detection and ranging or a laser imaging detection and ranging (LIDAR) that measures scattered light with respect to irradiation light and measures a distance to a target. For example, the finder 20-1 is attached to a front grille and the like, and the finders 20-2 and 20-3 are attached to a lateral surface of a vehicle body, a door mirror, the inside of a headlight, the vicinity of a side lamp, and the like. The finder 20-4 is attached to a trunk lid, and the like, and the finders 20-5 and 20-6 are attached to a lateral surface of the vehicle, the inside of a tail lamp, and the like. For example, the above-described finders 20-1 to 20-6 have a detection region of approximately 150° with respect to a horizontal direction. In addition, the finder 20-7 is attached to a roof and the like. For example, the finder 20-7 has a detection region of 360° with respect to the horizontal direction.

For example, the above-described radars 30-1 and 30-4 are long range millimeter wave radars in which a detection region in a depth direction is wider in comparison to other radars. In addition, the radars 30-2, 30-3, 30-5, and 30-6 are intermediate range millimeter radars in which a detection region in the depth direction is narrower in comparison to the radars 30-1 and 30-4.

Hereinafter, in a case where the finders 20-1 to 20-7 are not particularly discriminated, the finders 20-1 to 20-7 are simply described as "finder 20". In a case where the radars 30-1 to 30-6 are not particularly discriminated, the radars 30-1 to 30-6 are simply described as "radar 30". For example, the radar 30 detects an object by a frequency modulated continuous wave (FM-CW) method.

For example, the camera 40 is a digital camera that uses an individual imaging element such as a charge coupled device (CCD) and a complementary metal oxide semiconductor (CMOS). The camera 40 is attached to an upper side of a windshield, a rear surface of a rearview mirror, and the like. For example, the camera 40 periodically and repetitively captures an image of the area in front of the host vehicle M. The camera 40 may be a stereo camera including a plurality of cameras.

In addition, the configurations illustrated in FIG. 1 are illustrative only, and parts of the configurations may be omitted or other configurations may be added.

First Embodiment

Figure 2:
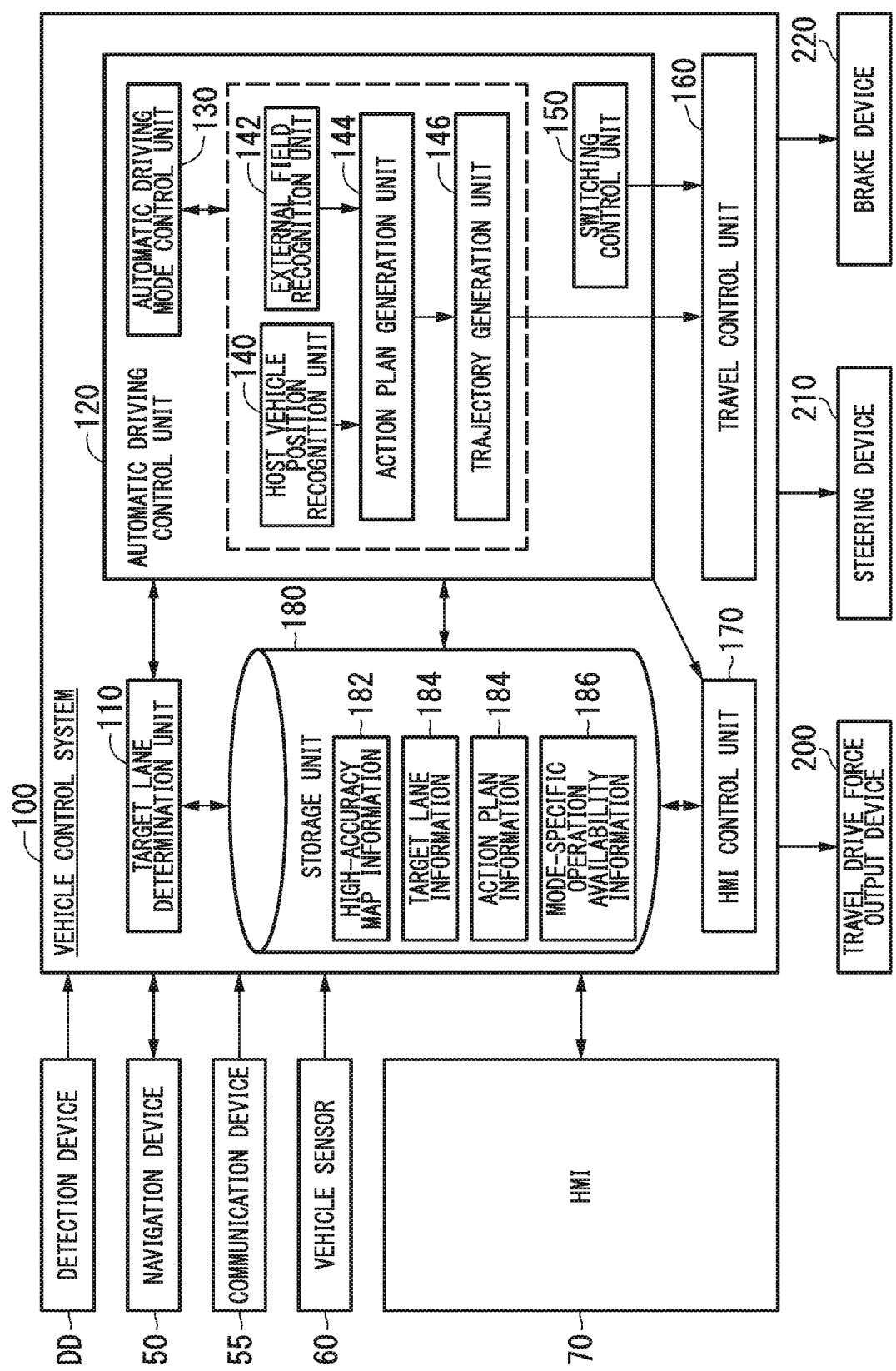
FIG. 2 is a functional configuration diagram with a focus on the vehicle control system 100.

FIG. 2 is a functional configuration diagram with a focus on the vehicle control system 100. A detection device DD including the finder 20, the radar 30, the camera 40, and the like, the navigation device 50, a communication device 55, a vehicle sensor 60, a human machine interface (HMI) 70, the vehicle control system 100, a travel drive force output device 200, a steering device 210, and a brake device 220 are mounted on the host vehicle M. The devices or apparatus are connected to each other through a multiplex communication line such as a controller area network (CAN) communication line, a serial communication line, a radio communication line, and the like. In addition, a vehicle control system in the appended claims does not represent only the "vehicle control system 100", and may include a configuration (the detection device DD, the HMI 70, and the like) other than the vehicle control system 100.

The navigation device 50 includes global navigation satellite system (GNSS) receiver and map information (navigation map), a touch panel type display device that functions as a user interface, a speaker, a microphone, and the like. The navigation device 50 specifies a position of the host vehicle M by the GNSS receiver, and derives a route from the position to a destination that is designated by a user. The route derived by the navigation device 50 is provided to a target lane determination unit 110 of the vehicle control system 100. The position of the host vehicle M may be specified or supplemented by an inertial navigation system (INS) that uses an output of the vehicle sensor 60. In addition, when the vehicle control system 100 executes a manual driving mode, the navigation device 50 performs guidance with respect to the route to the destination with voice or navigation display. In addition, the configuration that specifies the position of the host vehicle M may be provided independently from the navigation device 50. In addition, the navigation device 50 may be realized, for example, by a function of a terminal device such as a smart phone and a tablet terminal which are carried by a user. In this case, information is transmitted and received between the terminal device and the vehicle control system 100 by wireless or wired communication.

For example, the communication device 55 performs radio communication using a cellular network, a Wi-Fi network, Bluetooth (registered trademark), dedicated short range communication (DSRC), and the like.

The vehicle sensor 60 includes a vehicle speed sensor that detects a vehicle speed, an acceleration sensor that detects acceleration, a yaw rate sensor that detects an angular velocity around a vertical axis, an orientation sensor that detects a direction of the host vehicle M, and the like.

Figure 3:
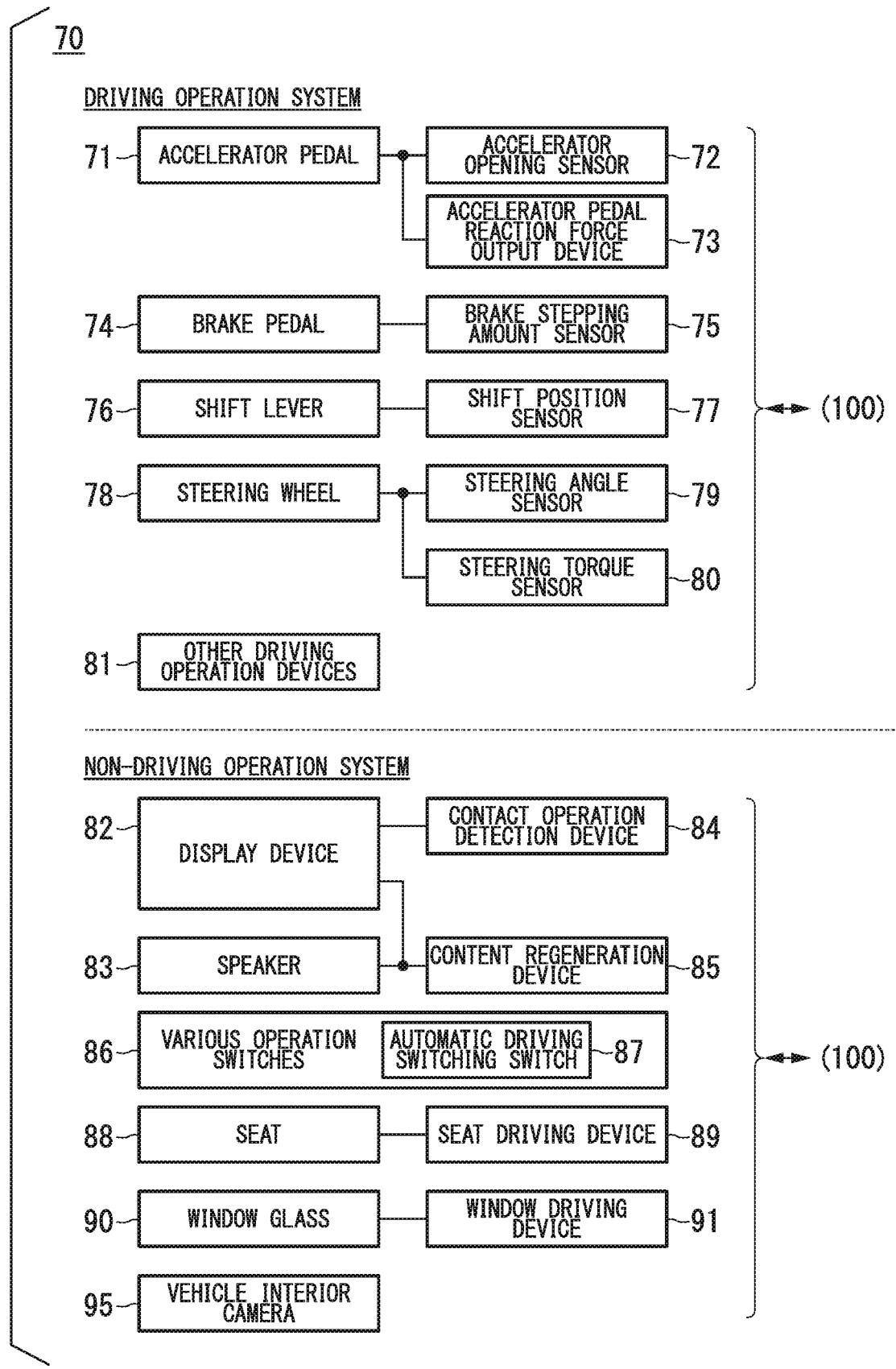
FIG. 3 is a configuration diagram of an HMI 70 according to a first embodiment.

FIG. 3 is a configuration diagram of the HMI 70 according to the first embodiment. For example, the HMI 70 includes a configuration of a driving operation system, and a configuration of a non-driving operation system. A boundary thereof is not clear, and the configuration of the driving operation system may include a function of the non-driving operation system (or vice versa). In addition, the driving operation system is an example of an operation accepting unit that accepts an operation of a vehicle occupant (occupant) of the host vehicle M. In addition, an interface device is included in the non-driving operation system.

For example, the HMI 70 includes an accelerator pedal 71, an accelerator opening sensor 72, an accelerator pedal reaction force output device 73, a brake pedal 74, a brake stepping amount sensor (or a master pressure sensor and the like) 75, a shift lever 76, a shift position sensor 77, a steering wheel 78, a steering angle sensor 79, a steering torque sensor 80, and other driving operation devices 81 as the configuration of the driving operation system.

The accelerator pedal 71 is an operator that accepts an acceleration instruction (or a deceleration instruction by a return operation) by the vehicle occupant. The accelerator opening sensor 72 detects a stepping amount of the accelerator pedal 71, and outputs an accelerator opening signal indicating the stepping amount to the vehicle control system 100. In addition, the accelerator opening signal may be directly output to the travel drive force output device 200, the steering device 210, or the brake device 220 instead of being output to the vehicle control system 100. This is also true of configurations of other driving operation systems to be described below. For example, the accelerator pedal reaction force output device 73 outputs a force (operation reaction force) in a direction opposite to an operation direction with respect to the accelerator pedal 71 in correspondence with an instruction from the vehicle control system 100.

The brake pedal 74 is an operator that accepts a deceleration instruction by the vehicle occupant. The brake stepping amount sensor 75 detects a stepping amount (or a stepping force) of the brake pedal 74, and outputs a brake signal indicating a detection result to the vehicle control system 100.

The shift lever 76 is an operator that accepts a shift stage change instruction by the vehicle occupant. The shift position sensor 77 detects a shift stage instructed by the vehicle occupant, and outputs a shift position signal indicating a detection result to the vehicle control system 100.

The steering wheel 78 is an operator that accepts a turning instruction by the vehicle occupant. The steering angle sensor 79 detects an operation angle of the steering wheel 78, and outputs a steering angle signal indicating a detection result to the vehicle control system 100. The steering torque sensor 80 detects torque applied to the steering wheel 78, and outputs a steering torque signal indicating a detection result to the vehicle control system 100. In addition, as control related to the steering wheel 78, for example, an operation reaction force may be output to the steering wheel 78 by outputting torque to a steering shaft by a reaction force motor and the like.

Examples of the other driving operation devices 81 include a joy stick, a button, a dial switch, a graphical user interface (GUI) switch, and the like. The other driving operation devices 81 accept an acceleration instruction, a deceleration instruction, a turning instruction, and the like, and output the instructions to the vehicle control system 100.

For example, the HMI 70 includes a display device (display unit) 82, a speaker 83, a contact operation detection device 84, a content regeneration device 85, various operation switches 86, a seat 88, a seat driving device 89, a window glass 90, a window driving device 91, a vehicle interior camera (imaging unit) 95, and a communication terminal 96 as the configuration of the non-driving operation system.

Examples of the display device 82 include a liquid crystal display (LCD), an organic electroluminescence (EL) display device, and the like which are attached to respective portions of an instrument panel, an arbitrary site that faces the passenger's seat or a rear seat, and the like. In addition, the display device 82 may be a head-up display (HUD) that projects an image on a front windshield or another window. The speaker 83 outputs voice. In a case where the display device 82 is a touch panel, the contact operation detection device 84 detects a contact position (touch position) on a display screen of the display device 82, and outputs the contact position to the vehicle control system 100. In addition, in a case where the display device 82 is not the touch panel, the contact operation detection device 84 may be omitted.

For example, the content regeneration device 85 includes a digital versatile disc (DVD) regeneration device, a compact disc (CD) regeneration device, a television receiver, a generation device of various guidance images, and the like. One or all of the display device 82, the speaker 83, the contact operation detection device 84, and the content regeneration device 85 may be common to the navigation device 50.

The various operation switches 86 are disposed at an arbitrary site on a vehicle interior side. The various operation switches 86 include an automatic driving switching switch 87 that gives an instruction of initiation (or initiation in the future) and stoppage of automatic driving. The automatic driving switching switch 87 may be any one of a graphical user interface (GUI) switch and a mechanical switch. In addition, the various operation switches 86 may include a switch that drives the seat driving device 89 or the window driving device 91.

The seat 88 is a seating seat which the vehicle occupant is seated. The seat driving device 89 freely drives a reclining angle, a position in a front and rear direction, a yaw angle of the seat 88, and the like. For example, the window glass 90 is provided in respective doors. The window driving device 91 performs opening/closing operation of the window glass 90.

The vehicle interior camera 95 is a digital camera that uses an individual imaging element such as a CCD and CMOS. The vehicle interior camera 95 is attached to a position such as a rearview mirror, a steering boss portion, and an instrument panel at which an image of at least the head of the vehicle occupant who performs a driving operation can be captured. For example, the vehicle interior camera 95 periodically and repetitively captures an image of the vehicle occupant.

The communication terminal 96 is a terminal that receives information from an HMI control unit 170 through radio communication with the communication device 55, and can display the information on a screen, and can also transmit information to the HMI control unit 170. The communication terminal 96 can display information, which is displayed by the navigation device 50, the display device 82, or the content regeneration device 85, on the screen. In addition, the communication terminal 96 can also acquire information from an external device through connection to the Internet and the like or perform transmission and reception of a mail by an electronic mail function. Information (for example, address information) necessary for communication with the communication terminal 96 and the like are stored in a storage unit 180 in advance. Examples of the communication terminal 96 include a smartphone, a tablet terminal, and the like, but there is no limitation thereto.

The travel drive force output device 200, the steering device 210, and the brake device 220 will be described prior to description of the vehicle control system 100.

The travel drive force output device 200 outputs a travel drive force (torque) necessary for driving of a vehicle to drive wheels. For example, the travel drive force output device 200 includes an engine, a transmission, and an engine electronic control unit (ECU) that controls the engine in a case where the host vehicle M is a vehicle that uses an internal combustion engine as a power source, a travel motor and a motor ECU that controls the travel motor in a case where the host vehicle M is an electric vehicle that uses an electric motor as the power source, or the engine, the transmission, the engine ECU, the travel motor, and the motor ECU in a case where the host vehicle M is a hybrid vehicle. In a case where the travel drive force output device 200 includes only the engine, the engine ECU adjusts a throttle opening of the engine, a shift stage, and the like in accordance with information input from a travel control unit 160 to be described later. In addition, in a case where the travel drive force output device 200 includes only the travel motor, the motor ECU adjusts a duty ratio of a PWM signal that is applied to the travel motor in accordance with information input from the travel control unit 160. In addition, in a case where the travel drive force output device 200 includes both the engine and the travel motor, the engine ECU and the motor ECU control the travel drive force in cooperation with each other in accordance with information input from the travel control unit 160.

For example, the steering device 210 includes a steering ECU, and an electric motor. For example, the electric motor applies a force to a rack and pinion mechanism to change a direction of a steering wheel. The steering ECU drives the electric motor in accordance with information input from the vehicle control system 100, or information of a steering angle or steering torque which is input to change the direction of the steering wheel.

For example, the brake device 220 is an electric servo-brake device including a brake caliper, a cylinder that transmits a hydraulic pressure to the brake caliper, an electric motor that generates the hydraulic pressure in the cylinder, and a braking control unit. The braking control unit of the electric servo-brake device controls the electric motor in accordance with information input from the travel control unit 160 to allow brake torque corresponding to a braking operation to be output to respective wheels. The electric servo-brake device may include a mechanism that transmits a hydraulic pressure generated by an operation of the brake pedal to the cylinder through a master cylinder as a backup mechanism. In addition, the brake device 220 may be an electronic control type hydraulic brake device without limitation to the above-described electric servo-brake device. The electronic control type hydraulic brake device controls an actuator in accordance with information input from the travel control unit 160 to transmit a hydraulic pressure of the master cylinder to the cylinder. In addition, the brake device 220 may include a regenerative brake realized by a travel motor that can be included in the travel drive force output device 200.

[Vehicle Control System]

Hereinafter, the vehicle control system 100 will be described. The vehicle control system 100 is realized, for example, by one or more processors or hardware having an equivalent function. The vehicle control system 100 may have a configuration in which an electronic control unit (ECU) in which a processor such as a central processing unit (CPU), a storage device, and a communication interface are connected to each other by an internal bus, a micro-processing unit (MPU), and the like are combined with each other.

Returning to FIG. 2, the vehicle control system 100 includes, for example, the target lane determination unit 110, an automatic driving control unit 120, the travel control unit 160, the HMI control unit 170, and the storage unit 180. For example, the automatic driving control unit 120 includes an automatic driving mode control unit 130, a host vehicle position recognition unit 140, an external field recognition unit 142, an action plan generation unit 144, a trajectory generation unit 146, and a switching control unit 150. Some or all of the target lane determination unit 110, the respective units of the automatic driving control unit 120, and the travel control unit 160 are realized when a processor executes a program (software). In addition, some or all of the units may be realized by hardware such as large scale integration (LSI) and an application specific integrated circuit (ASIC), or may be realized by a combination of software and the hardware.

For example, information such as high-accuracy map information 182, target lane information 184, action plan information 186, and mode-specific operation availability information 188 is stored in the storage unit 180. The storage unit 180 is realized by a read only memory (ROM), a random access memory (RAM), a hard disk drive (HDD), a flash memory, and the like. The program that is executed by the processor may be stored in the storage unit 180 in advance, or may be downloaded from an external device through in-vehicle internet equipment, and the like. In addition, the program may be installed in the storage unit 180 when a portable storage medium that stores the program is mounted in a drive device (not illustrated). In addition, a computer (in-vehicle computer) of the vehicle control system 100 may be dispersed among a plurality of computer devices.

For example, the target lane determination unit 110 is realized by an MPU. The target lane determination unit 110 divides a route provided form the navigation device 50 into a plurality of blocks (for example, divides the route for every 100 [m] in a vehicle advancing direction), and determines a target lane for every block with reference to the high-accuracy map information 182. For example, the target lane determination unit 110 makes a determination on travelling in which lane from the left. For example, in a case where a branch site, a merging site, and the like exist in the route, the target lane determination unit 110 determines a target lane so that the host vehicle M can travel along a reasonable travel route to advance to a branch destination. The target lane determined by the target lane determination unit 110 is stored in the storage unit 180 as the target lane information 184.

The high-accuracy map information 182 is map information with higher accuracy in comparison to a navigation map included in the navigation device 50. For example, the high-accuracy map information 182 includes information of the center of the lane, information of a boundary of the lane, and the like. In addition, the high-accuracy map information 182 includes road information, traffic regulation information, address information (addresses, postal codes), facility information, telephone number information, and the like. The road information includes information indicating a road type such as an expressway, a toll road, a national road, and a prefectural road, and information such as the number of lanes of a road, a width of each lane, a gradient of a road, a position of a road (three-dimensional coordinates including a longitude, a latitude, and height), a curvature of a curve of a lane, a position of a merging point and a branch point of lanes, a sign installed on the road. The traffic regulation information includes information indicating a situation in which lanes are blocked due to construction, traffic accidents, traffic congestion, and the like.

The automatic driving control unit 120 automatically controls at least one of acceleration/deceleration, and steering of the host vehicle M so that the host vehicle M travels along a route to a destination.

The automatic driving mode control unit 130 determines a mode of automatic driving that is performed by the automatic driving control unit 120. The mode of the automatic driving in this embodiment includes the following modes. In addition, the following description is illustrative only, and the number of modes of automatic driving may be determined in an arbitrary manner.

[First Mode]

A first mode is a mode in which the degree of automatic driving is higher in comparison to other modes. In a case where the first mode is performed, the entirety of vehicle control such as complicated merging control is automatically performed, and thus it is not necessary for a vehicle occupant to monitor the periphery or a state of the host vehicle M.

[Second Mode]

A second mode is a mode in which the degree of automatic driving is high next to the first mode. In a case where the second mode is performed, principally, the entirety of vehicle control is automatically performed, but a driving operation of the host vehicle M is delegated to the vehicle occupant in correspondence with a situation. According to this, it is necessary for the vehicle occupant to monitor the periphery or the state of the vehicle M.

[Third Mode]

The third mode is a mode in which the degree of automatic driving is high next to the second mode. In a case where the third mode is performed, it is necessary for the vehicle occupant to perform a confirmation operation corresponding to a situation with respect to the HMI 70. In the third mode, for example, in a case where the vehicle occupant is notified of a lane changing timing, and the vehicle occupant performs an operation of instructing the HMI 70 to change a lane, automatic lane change is performed. According to this, it is necessary for the vehicle occupant to monitor the periphery or the state of the host vehicle M.

The automatic driving mode control unit 130 determines the mode of the automatic driving on the basis of an operation by the vehicle occupant with respect to the HMI 70, an event determined by the action plan generation unit 144, a travel aspect determined by the trajectory generation unit 146, and the like. The HMI control unit 170 is notified of the mode of the automatic driving. In addition, a limit corresponding to a performance of the detection device DD of the host vehicle M, and the like may be set to the mode of the automatic driving. For example, in a case where the performance of the detection device DD is low, the first mode may not be performed.

In any mode, switching into manual driving mode (overriding) can be performed by an operation with respect to a configuration of the driving operation system in the HMI 70. For example, the overriding is initiated in a case where the operation by the vehicle occupant of the host vehicle M with respect to the driving operation system of the HMI 70 continues over a predetermined time, the operation is equal to or greater than a predetermined operation variation amount (for example, an accelerator opening of the accelerator pedal 71, a brake stepping amount of the brake pedal 74, a steering angle of the steering wheel 78), or the operation with respect to the driving operation system is performed in a predetermined number of times or greater. The predetermined time, the operation variation amount, the predetermined number of times, and the like are an example of a condition (threshold value) when making a determination as to whether or not overriding is to be performed.

The host vehicle position recognition unit 140 of the automatic driving control unit 120 recognizes a lane (travel lane) in which the host vehicle M travels, and a relative position of the host vehicle M with respect to a travel lane on the basis of the high-accuracy map information 182 stored in the storage unit 180, and information input from the finder 20, the radar 30, the camera 40, the navigation device 50, or the vehicle sensor 60.

For example, the host vehicle position recognition unit 140 recognizes the travel lane by comparing a pattern of a road partition line (for example, an arrangement of a solid line and a broken line) that is recognized from the high-accuracy map information 182, and a pattern of a load partition line at the periphery of the host vehicle M that is recognized from an image captured by the camera 40. In the recognition, a position of the host vehicle M which is acquired from the navigation device 50, or a processing result by the INC may be added.

Figure 4:
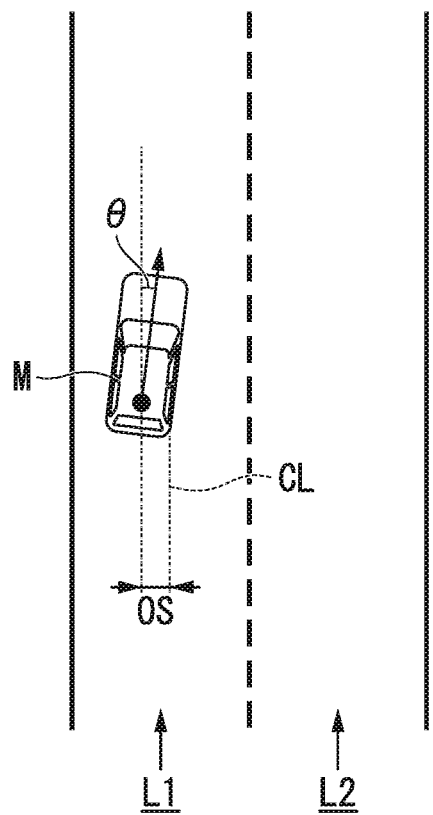
FIG. 4 is a view illustrating an aspect in which a relative position of a host vehicle M with respect to a travel lane L1 is recognized by a host vehicle position recognition unit 140.

FIG. 4 is a view illustrating an aspect in which a relative position of the host vehicle M with respect to a travel lane L1 is recognized by the host vehicle position recognition unit 140. For example, the host vehicle position recognition unit 140 recognizes a deviation OS of a reference point (for example, the center of gravity) of the host vehicle M from the travel lane center CL, and an angle θ of an advancing direction of the host vehicle M with respect to a line obtained by connecting travel lane centers CL as a relative position of the host vehicle M with respect to the travel lane L1. In addition, alternatively, the host vehicle position recognition unit 140 may recognize a position of the reference point of the host vehicle M with respect to any lateral end of the host vehicle lane L1, and the like as the relative position of the host vehicle M with respect to the travel lane. The relative position of the host vehicle M which is recognized by the host vehicle position recognition unit 140 is provided to the action plan generation unit 144.

The external field recognition unit 142 recognizes a state such as a position, a speed, and an acceleration of a nearby vehicle on the basis of information input from the finder 20, the radar 30, the camera 40, and the like. For example, the nearby vehicle is a vehicle that travels in the vicinity of the host vehicle M and travels in the same direction as the host vehicle M. The position of the nearby vehicle may be indicated as a representative position such as the center of gravity and a corner of another vehicle, or may be indicated as a region that is expressed as a contour of the other vehicle. The "state" of the nearby vehicle may include an acceleration of the nearby vehicle, and whether or not the nearby vehicle is changing a lane (or whether or not the nearby vehicle intends to change lanes) which are understood on the basis of information of the various devices. In addition, the external field recognition unit 142 may recognize positions of a guard rail, an electric pole, a parked vehicle, a pedestrian, and other objects in addition to the nearby vehicle.

The action plan generation unit 144 sets a start point of the automatic driving, and/or a destination of the automatic driving. The start point of the automatic driving may be a current position of the host vehicle M, or a point at which an operation of instructing the automatic driving is performed. The action plan generation unit 144 generates an action plan in a section between the start point and the destination of the automatic driving. In addition, the action plan generation unit 144 may generates an action plan with respect to an arbitrary section without limitation to the above-described action plan.

For example, the action plan includes a plurality of events which are sequentially executed. Examples of the events include a deceleration event of decelerating the host vehicle M, an acceleration event of accelerating the host vehicle M, a lane keeping event of allowing the host vehicle M to travel without deviating from a travel lane, a lane changing event of changing the travel lane, a passing event of allowing the host vehicle M to pass a preceding vehicle, a branch event of changing a lane to a desired lane at a branch point or allowing the host vehicle M to travel without deviating from the current travel lane, a merging event of accelerating or decelerating the host vehicle M at a merging lane to be merged to a main lane, and changing a travel lane, an hand-over event of transitioning a manual driving mode to an automatic driving mode at an initiation point of the automatic driving or transitioning the automatic driving mode to the manual driving mode at a scheduled termination point of the automatic driving, and the like. At a site at which a target lane determined by the target lane determination unit 110 is changed, the action plan generation unit 144 sets the lane changing event, the branch event, or the merging event. Information indicating an action plan generated by the action plan generation unit 144 is stored in the storage unit 180 as the action plan information 186.

Figure 5:
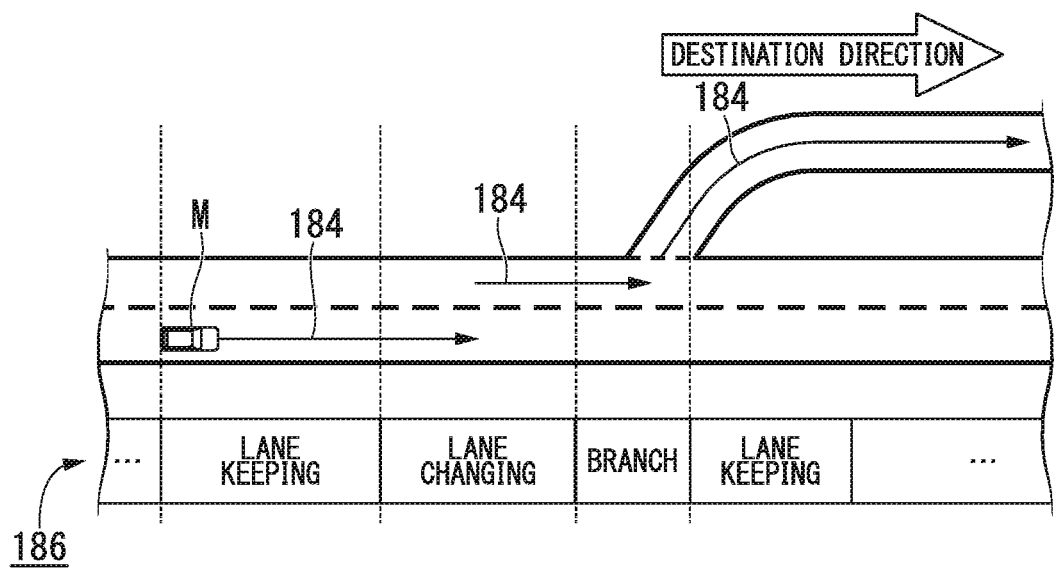
FIG. 5 is a view illustrating an example of an action plan that is generated with respect to an arbitrary section.

FIG. 5 is a view illustrating an example of an action plan that is generated with respect to an arbitrary section. As illustrated in FIG. 5, the action plan generation unit 144 generates an action plan that is necessary for the host vehicle M to travel in a target lane indicated by the target lane information 184. In addition, the action plan generation unit 144 may dynamically change the action plan in correspondence with a situation variation of the host vehicle M regardless of the target lane information 184. For example, in a case where a speed of a nearby vehicle recognized by the external field recognition unit 142 in travel exceeds a threshold value, or a movement direction of a nearby vehicle that travels in a lane adjacent to a host lane faces a host lane direction, the action plan generation unit 144 changes an event that is set in a driving section along which the host vehicle M is scheduled to travel. For example, when in a case where an event is set so that the lane changing event is executed after the lane keeping event, if it is determined by a recognition result of the external field recognition unit 142 that a vehicle advances at a speed equal to or higher than a threshold value from a backward side of a lane that is a lane changing destination during the lane keeping event, the action plan generation unit 144 changes an event subsequent to the lane keeping event from the lane changing event to the deceleration event, the lane keeping event, and the like. As a result, even in a case where a variation occurs in the external field state, the vehicle control system 100 can allow the host vehicle M to stably perform automatic driving.

Figure 6:
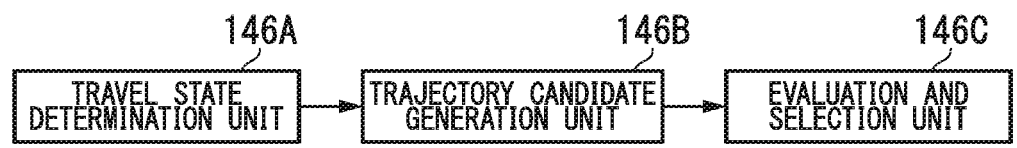
FIG. 6 is a view illustrating an example of a configuration of a trajectory generation unit 146.

FIG. 6 is a view illustrating an example of a configuration of the trajectory generation unit 146. For example, the trajectory generation unit 146 includes a travel aspect determination unit 146A, a trajectory candidate generation unit 146B, and an evaluation and selection unit 146C.

For example, when performing the lane keeping event, the travel aspect determination unit 146A determines any one travel aspect among constant speed travel, following travel, low-speed following travel, deceleration travel, curve travel, obstacle avoiding travel, and the like. For example, in a case where another vehicle does not exist in front of the host vehicle M, the travel aspect determination unit 146A determines the travel aspect as the constant speed travel. In addition, in a case of performing the following travel with respect to a preceding vehicle, the travel aspect determination unit 146A determines that travel aspect as the following travel. In addition, in a traffic jam situation, and the like, the travel aspect determination unit 146A determines the travel aspect as the low-speed following travel. In addition, in a case where deceleration of a preceding vehicle is recognized by the external field recognition unit 142, or in a case of performing an event such as stopping and parking, the travel aspect determination unit 146A determines the travel aspect as the deceleration travel. In addition, in a case where the external field recognition unit 142 recognizes that the host vehicle M reaches a curved road, the travel aspect determination unit 146A determines the travel aspect as the curve travel. In addition, in a case where the external field recognition unit 142 recognizes an obstacle in front of the host vehicle M, the travel aspect determination unit 146A determines the travel mode as the obstacle avoiding travel.

Figure 7:
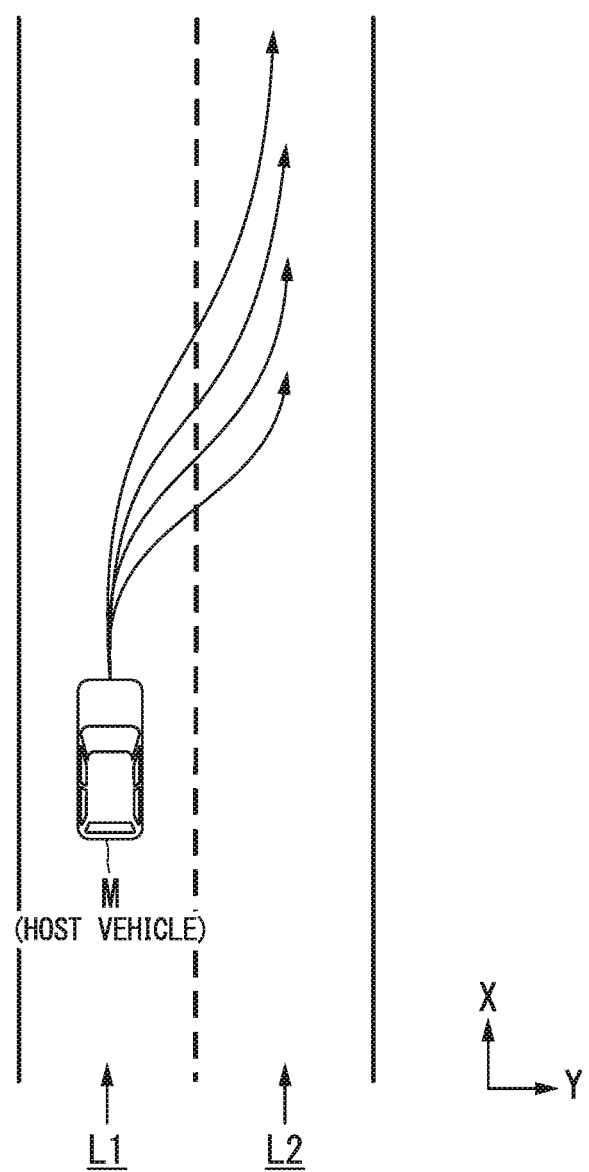
FIG. 7 is a view illustrating an example of a trajectory candidate that is generated by a trajectory candidate generation unit 146B.

The trajectory candidate generation unit 146B generates a trajectory candidate on the basis of a travel aspect determined by the travel aspect determination unit 146A. FIG. 7 is a view illustrating an example of a trajectory candidate generated by the trajectory candidate generation unit 146B. FIG. 7 illustrates the trajectory candidate that is generated in a case where the host vehicle M changes a lane from a lane L1 to a lane L2.

Figure 8:
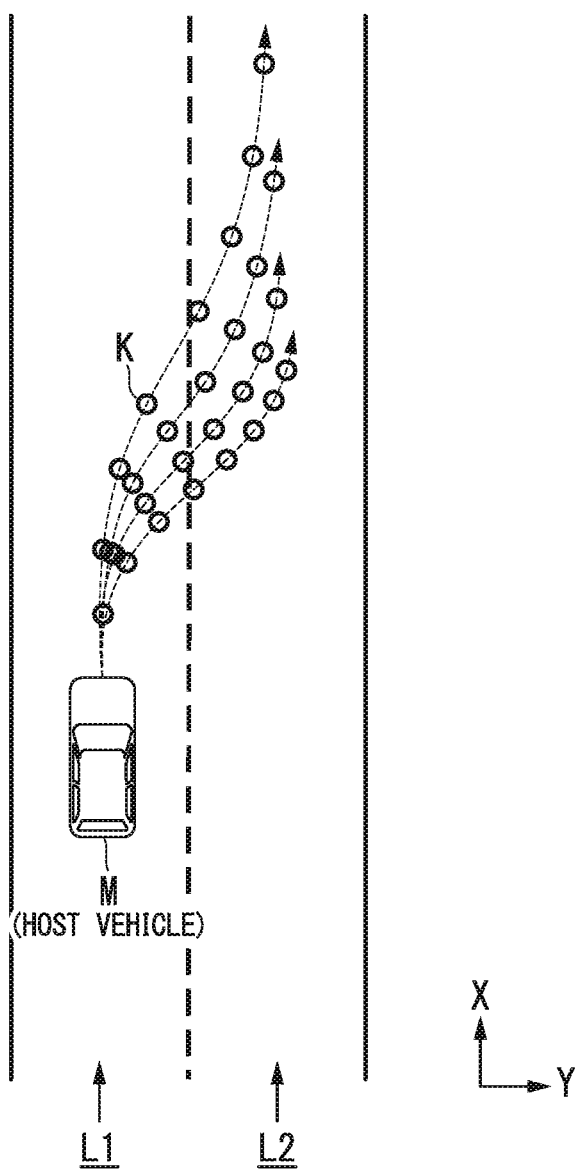
FIG. 8 is a view illustrating the trajectory candidate that is generated by the trajectory candidate generation unit 146B as a trajectory point K.

The trajectory candidate generation unit 146B determines trajectories illustrated in FIG. 7, for example, as a group of target positions (trajectory points K) in which a reference position (for example, the center of gravity or the center of a rear wheel axis) of the host vehicle M is to reach for every predetermined time in the future. FIG. 8 is a view in which trajectory candidates generated by the trajectory candidate generation unit 146B are expressed as trajectory points K. As an interval between the trajectory points K is wider, a speed of the host vehicle M is raised, and as the interval between the trajectory points K is narrower, the speed of the host vehicle M is lowered. Accordingly, in a case of desiring to accelerate, the trajectory candidate generation unit 146B gradually widens the interval of the trajectory points K, and in a case of desiring to decelerate, the trajectory candidate generation unit 146B gradually narrows the intervals of the trajectory points.

As described above, since the trajectory points K include a speed component, it is necessary for the trajectory candidate generation unit 146B to apply a target speed to each of the trajectory points K. The target speed is determined by the travel aspect determined by the travel aspect determination unit 146A.

Figure 9:
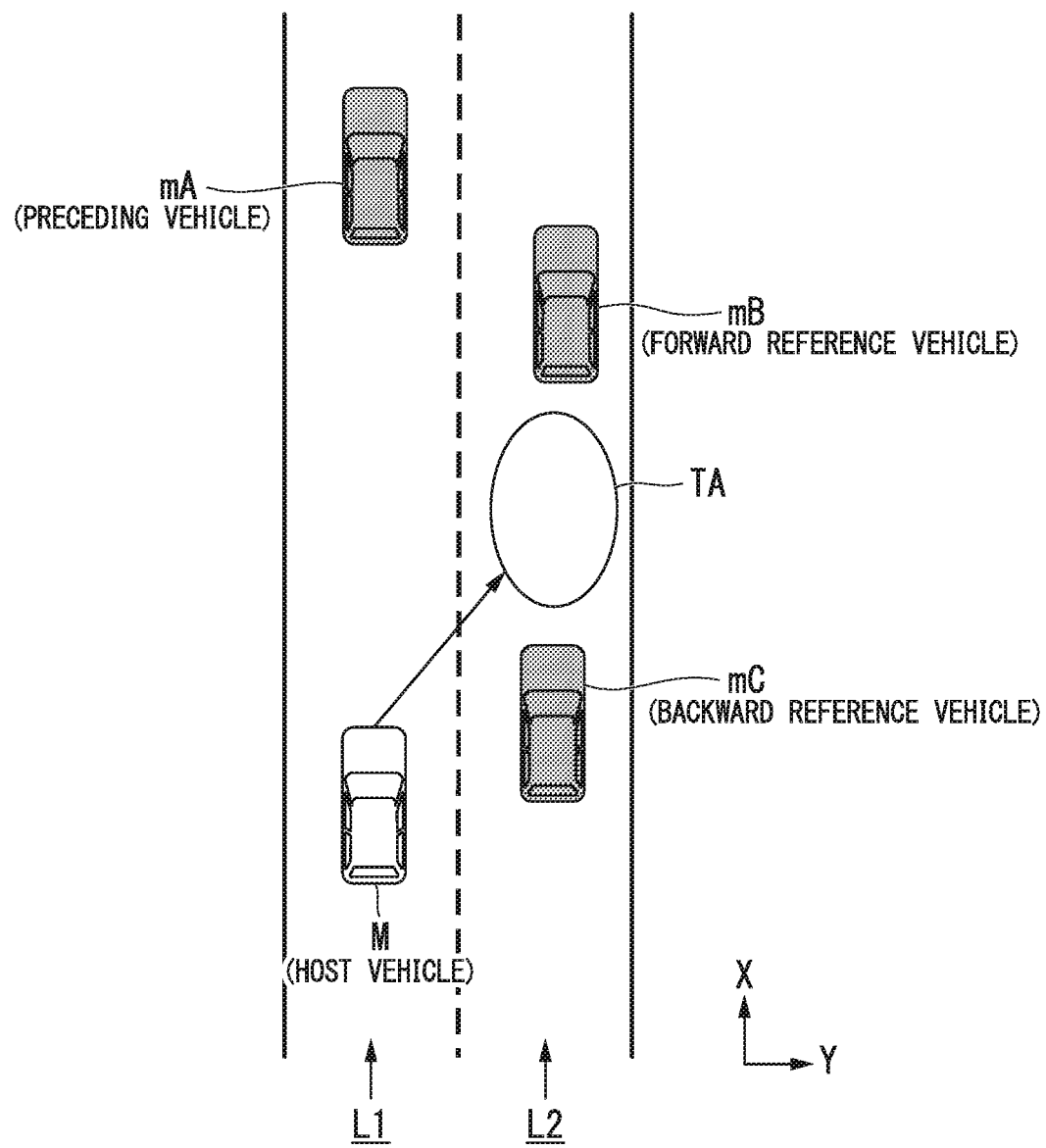
FIG. 9 is a view illustrating a lane changing target position TA.

Here, description will be given of a method of determining a target speed in a case of performing lane changing (including branch). First, the trajectory candidate generation unit 146B sets a lane changing target position (or a merging target position). The lane changing target position is set as a relative position with a nearby vehicle, and corresponds to determination of "lane is to be changed with respect to which nearby vehicle". The trajectory candidate generation unit 146B determines a target speed in a case of performing lane changing with focus given to three nearby vehicles with a lane changing target position set as a reference. FIG. 9 is a view illustrating a lane changing target position TA. In the drawing, L1 represents a host lane, and L2 represents a nearby lane. Here, a nearby vehicle that travels immediately in front of the host vehicle M in the same lane as that of the host vehicle M is defined as a preceding vehicle mA, a nearby vehicle that travels immediately in front of the lane changing target position TA is defined as a forward reference vehicle mB, and a nearby vehicle that travels immediately behind the lane changing target position TA is defined as a backward reference vehicle mC. It is necessary for the host vehicle M to perform acceleration/deceleration to move to a lateral side of the lane changing target position TA, but it is necessary for the host vehicle M to avoid catching up with the preceding vehicle mA. According to this, the trajectory candidate generation unit 146B predicts a future state of the three nearby vehicles, and determines the target speed so as not to interfere with the nearby vehicles.

Figure 10:
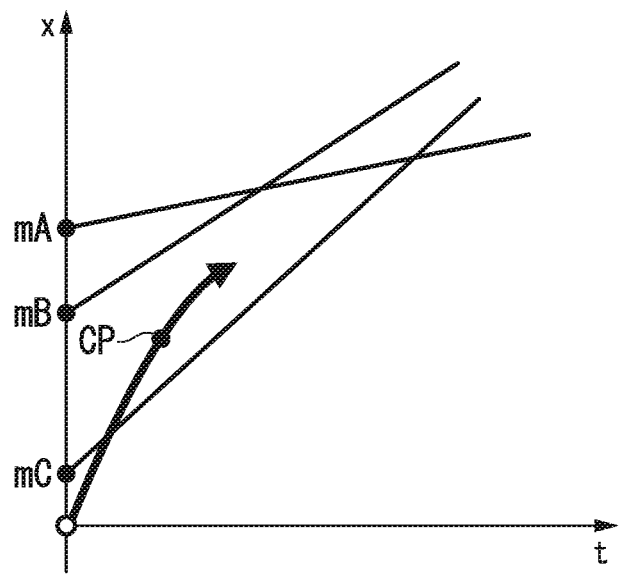
FIG. 10 is a view illustrating a speed generation model in a case where speeds of three nearby vehicles are assumed to be constant.

FIG. 10 is a view illustrating a speed generation model on the assumption that speeds of the three nearby vehicles are assumed to be constant. In the drawing, straight lines, which extend from mA, mB, and mC, represent a displacement in an advancing direction on the assumption that the nearby vehicles travel at a constant speed. At a point CP at which lane changing is completed, it is necessary for the host vehicle M to be present between the forward reference vehicle mB and the backward reference vehicle mC, and behind the preceding vehicle mA. Under the restriction, the trajectory candidate generation unit 146B derives a plurality of time-series patterns of a target speed until lane changing is completed. In addition, the time-series patterns of the target speed are applied to a model such as a spline curve to derive a plurality of the trajectory candidates as illustrated in FIG. 7. In addition, movement patterns of the three nearby vehicles may be predicted on the assumption of constant acceleration and constant jerk without limitation to the constant speed as illustrated in FIG. 9.

The evaluation and selection unit 146C performs evaluation with respect to the trajectory candidates generated by the trajectory candidate generation unit 146B, for example, from the two points of view of planning and stability, and selects a trajectory to be output to the travel control unit 160. For example, from the viewpoint of planning, in a case where trackability with respect to a plan (for example, an action plan) generated in advance is high and a total length of the trajectory is short, the trajectory is highly evaluated. For example, in a case where it is preferable to change a lane to the right, a trajectory in which a lane is changed to the left at once and returns is lowly evaluated. From the viewpoint of stability, for example, in each trajectory point, as a distance between the host vehicle M and an object (a nearby vehicle and the like) is longer, a variation amount of acceleration or deceleration and a steering angel, and the like are smaller, the trajectory is highly evaluated.

The switching control unit 150 switches the automatic driving mode and the manual driving mode from each other on the basis of a signal that is input from the automatic driving switching switch 87. In addition, the switching control unit 150 switches the automatic driving mode to the manual driving mode on the basis of an operation that gives an instruction for acceleration/deceleration or steering with respect to a configuration of the driving operation system in the HMI 70. For example, in a case where a state, in which an operation amount indicated by a signal input from the configuration of the driving operation system in the HMI 70 exceeds a threshold value, continues for a reference time or longer, the switching control unit 150 switches the automatic driving mode to the manual driving mode (overriding). In addition, after switching to the manual driving mode by the overriding, in a case where an operation with respect to the configuration of the driving operation system in the HMI 70 is not detected for a predetermined time, the switching control unit 150 may return the driving mode to the automatic driving mode. In addition, for example, in a case of performing handover control of transitioning to the manual driving mode from the automatic driving mode at a scheduled termination point of the automatic driving, the switching control unit 150 outputs information indicating the gist to the HMI control unit 170 to notify a vehicle occupant of a handover request in advance.

The travel control unit 160 controls the travel drive force output device 200, the steering device 210, and the brake device 220 so that the host vehicle M passes through a trajectory generated by the trajectory generation unit 146 at a scheduled time.

When being notified of information of the driving mode by the automatic driving control unit 120, the HMI control unit 170 controls the HMI 70. For example, the HMI control unit 170 controls availability of an operation by a vehicle occupant with respect to the non-driving operation system of the HMI 70, the navigation device 50, and the like on the basis of the driving mode.

Figure 11:
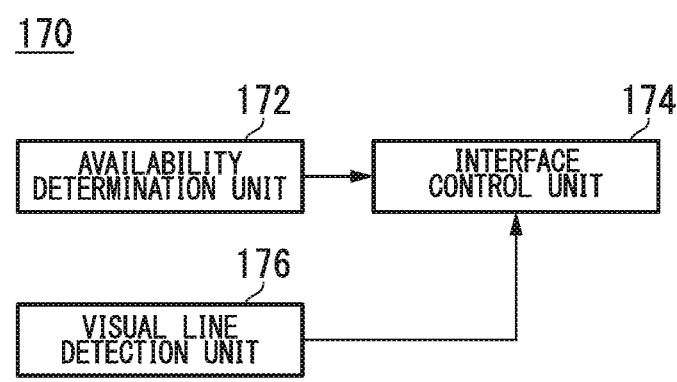
FIG. 11 is a view illustrating an example of a configuration of an HMI control unit 170 according to the first embodiment.

FIG. 11 is a view illustrating an example of a configuration of the HMI control unit 170 according to the first embodiment. The HMI control unit 170 illustrated in FIG. 11 includes an availability determination unit 172, an interface control unit 174, and a visual line detection unit 176.

The availability determination unit 172 determines whether or not an operation related to the HMI 70 or the navigation device 50 is available on the basis of mode information obtained from the automatic driving control unit 120 and a mode-specific operation availability information 188 stored in the storage unit 180.

FIG. 12 is a view illustrating an example of the mode-specific operation availability information 188. The mode-specific operation availability information 188 illustrated in FIG. 12 includes "manual driving mode" and "automatic driving mode" as an item of the driving mode. In addition, the "automatic driving mode" includes the "first mode", "second mode", "third mode", and the like. In addition, the mode-specific operation availability information 188 includes a "navigation operation" that is an operation with respect to the navigation device 50, a "contents regeneration operation" that is an operation with respect to the content regeneration device 85, an "instrument panel operation" that is an operation with respect to the display device 82, a "communication terminal operation" that is an operation with respect to the communication terminal 96, and the like as items of the non-driving operation system. The navigation device 50, the content regeneration device 85, the display device 82, and the communication terminal 96 are examples of an interface device of the non-driving operation system. In an example of the mode-specific operation availability information 188 illustrated in FIG. 12, availability of an operation by a vehicle occupant with respect to the non-driving operation system is set for every driving mode described above, but a target interface device is not limited thereto.

The availability determination unit 172 determines an interface device (operation system) for which use is permitted due to mitigation or release of restriction of use and the like, and an interface device for which use is not permitted due to restriction with reference to the mode-specific operation availability information 188 on the basis of an driving mode that is acquired from the automatic driving control unit 120. In addition, for example, "use" stated here represents one or both of acceptance of an operation by the vehicle occupant, and output of information to the interface device. The interface control unit 174 controls acceptability of an operation from the vehicle occupant with respect to the interface device of the non-driving operation system on the basis of a determination result by the availability determination unit 172.

For example, in a case where the host vehicle M is in the manual driving mode, the vehicle occupant operates the driving operation system (for example, the accelerator pedal 71, the brake pedal 74, the shift lever 76, the steering wheel 78, and the like) of the HMI 70. In addition, in a case of the second mode, the third mode, and the like of the automatic driving mode, it is necessary for the vehicle occupant to monitor the periphery or a state of the host vehicle M. In this case, the interface control unit 174 performs control so as not to accept an operation with respect to a part or the entirety of the non-driving operation system of the HMI 70 to prevent the vehicle occupant from being distracted (driver distraction) due to an action (operation and the like) other than driving. In addition, in a case of the first mode of the automatic driving, the interface control unit 174 performs control of mitigating the driver distraction regulation and accepting an operation of the vehicle occupant with respect to the non-driving operation system for which an operation was not accepted. That is, the interface control unit 174 restricts use of a part or the entirety of the non-driving operation system of the HMI 70 in the manual driving or the automatic driving in which monitoring of the periphery by the vehicle occupant is necessary, and releases the use in the automatic driving in which monitoring of the periphery by the vehicle occupant is not necessary.

In this case, for example, in a case where information to be given in notification from the host vehicle M to the vehicle occupant is generated along with changing of the mode of the automatic driving, the interface control unit 174 allows an interface device, for which restriction is mitigated or released along with changing of the mode of the automatic driving, to output predetermined information (for example, information to be given in notification to the vehicle occupant such as information indicating that use is permitted due to mitigation or release of restriction). As described above, information of an interface device that is usable during control of the automatic driving of the host vehicle M is transmitted to the vehicle occupant, and thus it is possible to raise convenience of the interface device.

In addition, the interface control unit 174 may output event information related to acceleration/deceleration or lane changing of the host vehicle in the automatic driving control unit 120 to the interface device for which use is permitted. In addition, in a case of accepting a handover request from the automatic driving control unit 120, the interface control unit 174 may output the gist to the interface device for which use is permitted. In this case, the interface control unit 174 allows the interface device to output information including one or both of the above-described event information and the handover request with respect to the vehicle occupant. According to this, the vehicle occupant can easily understand a driving state of the host vehicle M according to the automatic driving control.

In addition, in the first embodiment, the interface control unit 174 may acquire a visual line direction of the vehicle occupant of the host vehicle M, and may perform output control of the above-described various pieces of information with respect to an interface device that is in the acquired visual line direction. In this case, the visual line detection unit 176 detects the visual line of the vehicle occupant from a vehicle interior space image captured by the vehicle interior camera 95. For example, the visual line detection unit 176 detects positions of inner corners of eyes and an iris of the vehicle occupant on the basis of feature information such as luminance, a shape, and the like of the image that is captured, and can detect the visual line from a positional relationship between the inner corners of eyes and the iris. In addition, a visual line detection method is not limited to the above-described example.

Figure 13:
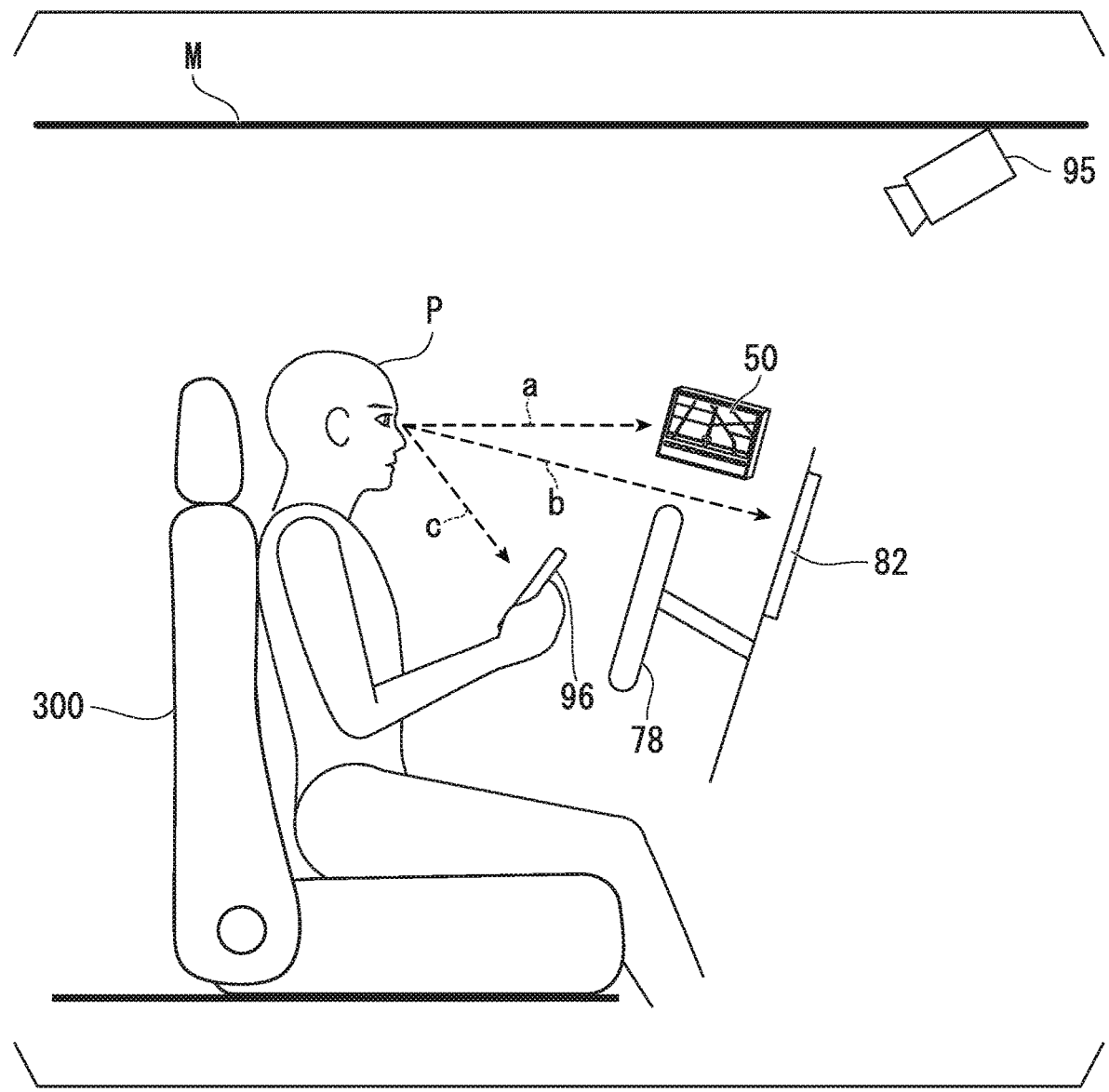
FIG. 13 is a view illustrating contents of visual line detection of a vehicle occupant.

FIG. 13 is a view illustrating contents of the visual line detection of the vehicle occupant. In an example illustrated in FIG. 13, the vehicle interior camera 95 that captures an image of the space inside the host vehicle M captures an image including a vehicle occupant P who is seated on a seat 88 provided inside the host vehicle M. The image captured by the vehicle interior camera 95 is output to the visual line detection unit 176. The visual line detection unit 176 detects a visual line direction of the vehicle occupant P from the image captured by the vehicle interior camera 95, and outputs information of the visual line direction that is detected to the interface control unit 174.

The interface control unit 174 acquires an interface device of the non-driving operation system for which use is permitted from the mode-specific operation availability information 188 on the basis of a driving mode that is obtained from the automatic driving control unit 120. In addition, the interface control unit 174 estimates an interface device, which is in the visual line direction of the vehicle occupant P among interface devices of the non-driving operation system for which use is permitted, from visual line information of the vehicle occupant P which is obtained from the visual line detection unit 176, and allows the estimated interface device to output at least one piece of information among a plurality of pieces of information such as information indicating that use is permitted, event information, and handover request. According to this, the information can be output to only an interface device that is highly likely to be seen by the vehicle occupant P, and thus it is possible to more reliably transmit information with respect to the vehicle occupant P.

With regard to the estimation of the interface device, for example, in a case where an imaging range (image angle) of the vehicle interior camera 95 is fixed, the interface control unit 174 can estimate an interface device that is in the visual line direction from positions on the captured image of the navigation device 50, the display device 82, and the content regeneration device 85, and information in the visual line direction. In addition, the interface control unit 174 may extract feature information such as a color and a shape from the image captured by the vehicle interior camera 95, and may estimate a position of the communication terminal 96 from the feature information that is extracted.

In the example of FIG. 13, the visual line direction of the vehicle occupant P is detected from the image captured by the vehicle interior camera 95. In a case where the visual line direction is an arrow a, the interface control unit 174 estimates that the vehicle occupant P views the navigation device 50, and allows the navigation device 50 to output information such as the information indicating that use is permitted, the event information, the handover request. In addition, in a case where the visual line direction is an arrow b, for example, the interface control unit 174 estimates that the vehicle occupant P views the display device 82 such as an instrument panel, and allows the display device 82 to output the above-described various pieces of information. In addition, in a case where the visual line direction is an arrow c, the interface control unit 174 estimates that the vehicle occupant P views the communication terminal 96, and allows the communication terminal 96 to output the above-described various kinds of information. According to this, for example, a notification is given from the host vehicle M to an interface device that is highly likely to be visually recognized by the vehicle occupant during release of regulation with respect to an interface device, and thus it is possible to make the vehicle occupant P be instantly aware of the notification. Accordingly, it is possible to improve convenience of the device.

In addition, in a case where an operation by the vehicle occupant P is not performed with respect to the driving operation system such as the steering wheel 78, and the like even after passage of a predetermined time after the notification of the handover request is given, the interface control unit 174 may notify the vehicle occupant P of the handover and the like by allowing another interface device, among a plurality of interface devices for which use is permitted, to output information, or to output information with voice and the like. According to this, it is possible to more reliably transmit information to the vehicle occupant. In addition, the interface control unit 174 may give a notification of information related to the driving mode.

Figure 14:
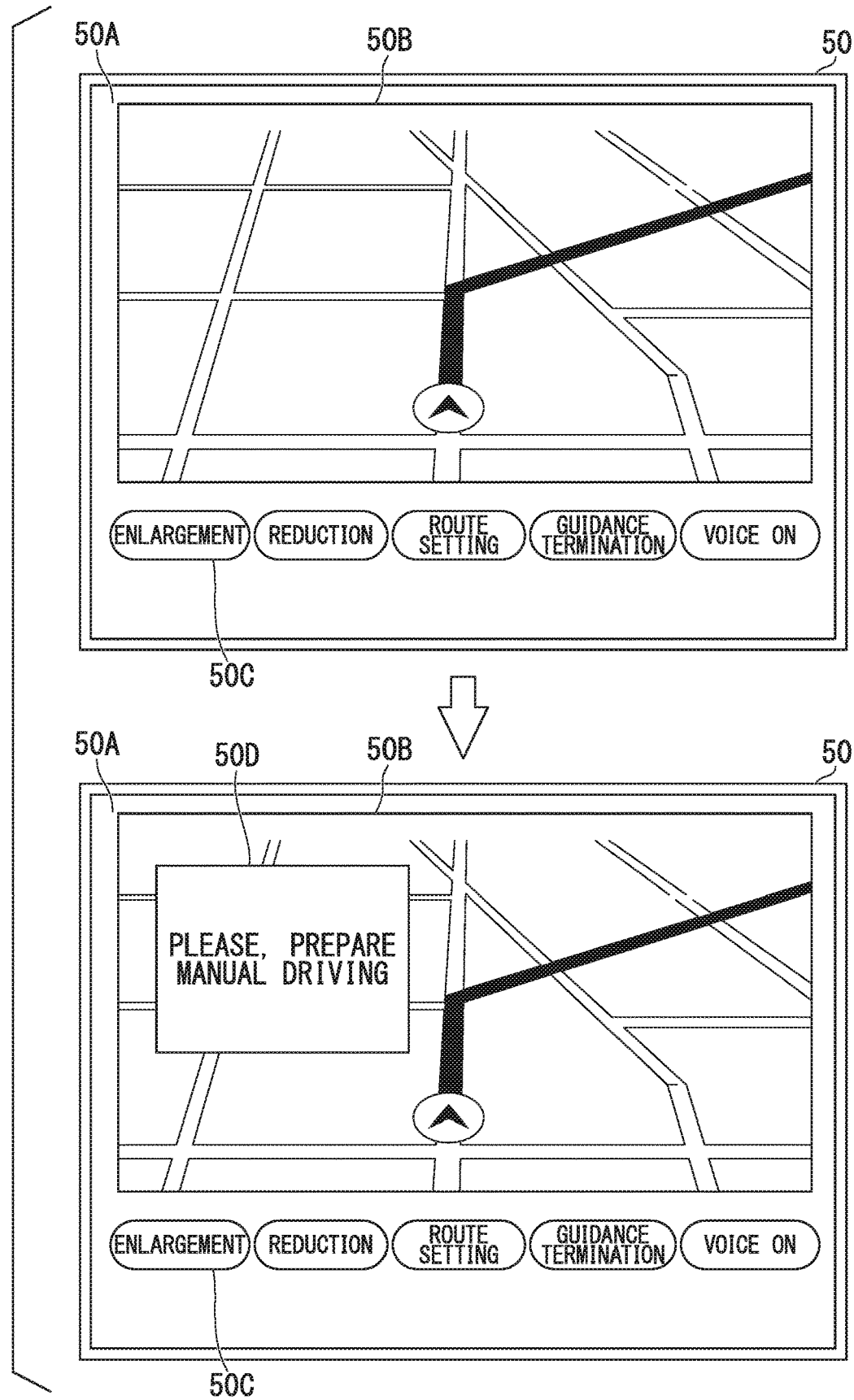
FIG. 14 is a view illustrating an example of information display with respect to a navigation device 50.

FIG. 14 is a view illustrating an example of information display with respect to the navigation device 50. In the navigation device 50 illustrated in the example of FIG. 14, a display screen SOB that displays route guidance, a setting screen, and the like, a setting button 50C that is used to set a destination and the like, and the like are provided on a front surface 50A. Here, according to the first embodiment, in a case where the navigation device 50 becomes an interface device for which use by the vehicle occupant P is permitted along with changing of the mode of the automatic driving, among a plurality of pieces of information such as the information indicating use is permitted, the event information, and the handover request, at least one piece of information is displayed on the display screen SOB as a message screen SOD. In the example of FIG. 14, display of a gist indicating that the vehicle occupant P is asked to prepare the manual driving is displayed on the message screen SOD in correspondence with the handover request, but the display content is not limited thereto. Contents to be displayed are stored in the storage unit 180 in advance. The interface control unit 174 may erase the message screen 50D, for example, after passage of a predetermined time, or in a case of displaying the subsequent message. The message screen 50D may be displayed in a flickered manner or a highlighted manner in correspondence with a background color.

Figure 15:
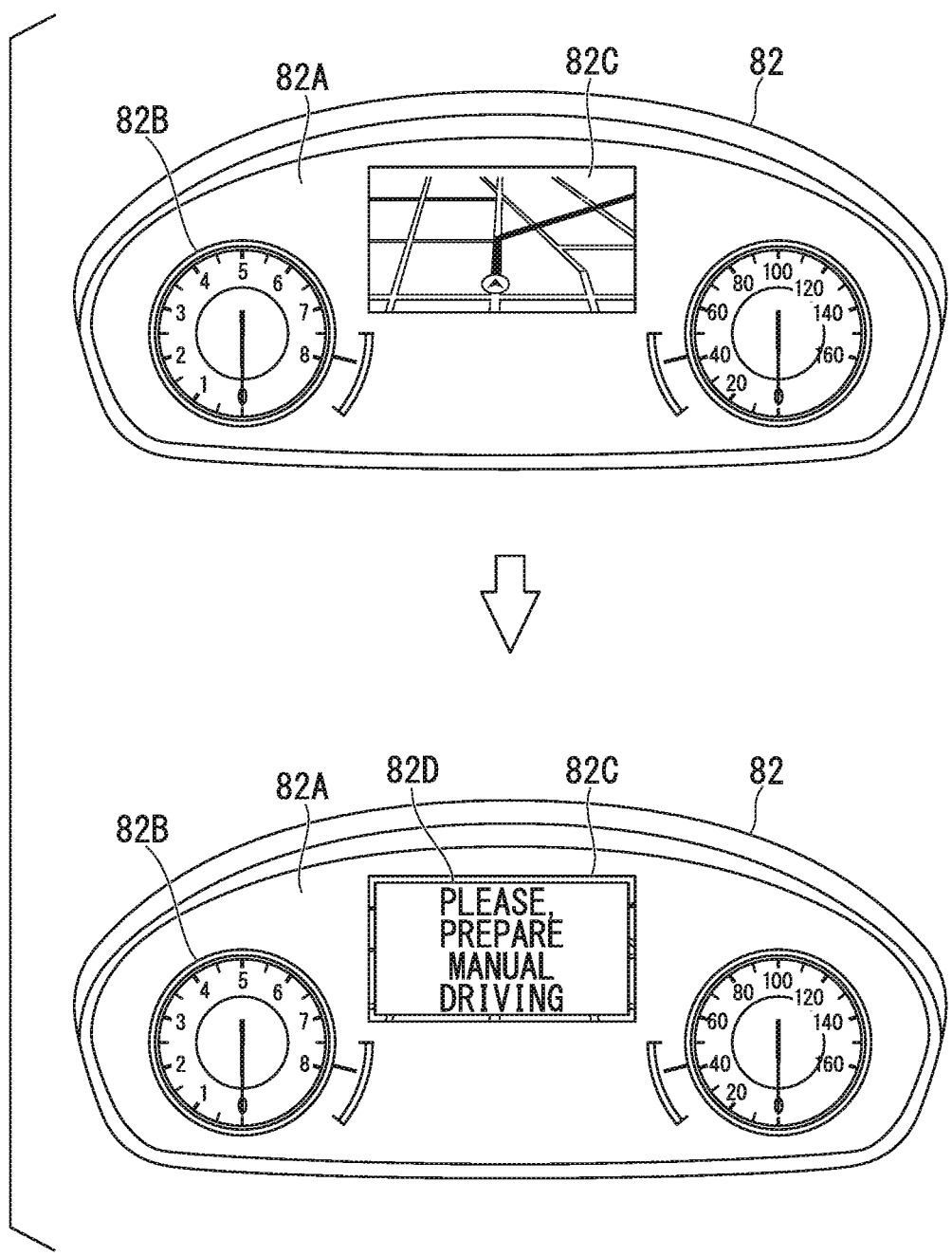
FIG. 15 is a view illustrating an example of information display with respect to a display device 82.

FIG. 15 is a view illustrating an example of information display with respect to the display device 82. The display device 82 illustrated in the example of FIG. 15 is provided with a meter display unit 82B that displays a speed meter or the number of rotation of torque, and a display screen 82C that displays various contents related to a reproduced video such as a DVD, route guidance, and a recreation and an entertainment such as television programs on a front surface 82A. The various contents displayed on the display screen 82C and the like are examples of contents capable of being displayed when the above-described driver distraction regulation is released.

Here, in the first embodiment, in a case where the display device 82 becomes an interface device for which use is permitted along with changing of the mode of the automatic driving, at least one piece of information among the plurality of pieces of information such as the information indicating use by the vehicle occupant P is permitted, the event information, and the handover request is displayed on the display screen 82C as a message screen 82D. In the example of FIG. 15, the message screen 82D corresponding to the handover request is displayed as in FIG. 14, but display contents are not limited thereto. The interface control unit 174 may erase the message screen 82D, for example, after passage of a predetermined time, or in a case of displaying the subsequent message. The message screen 82D may be displayed in a flickered manner or a highlighted manner in correspondence with a background color.

Figure 16:
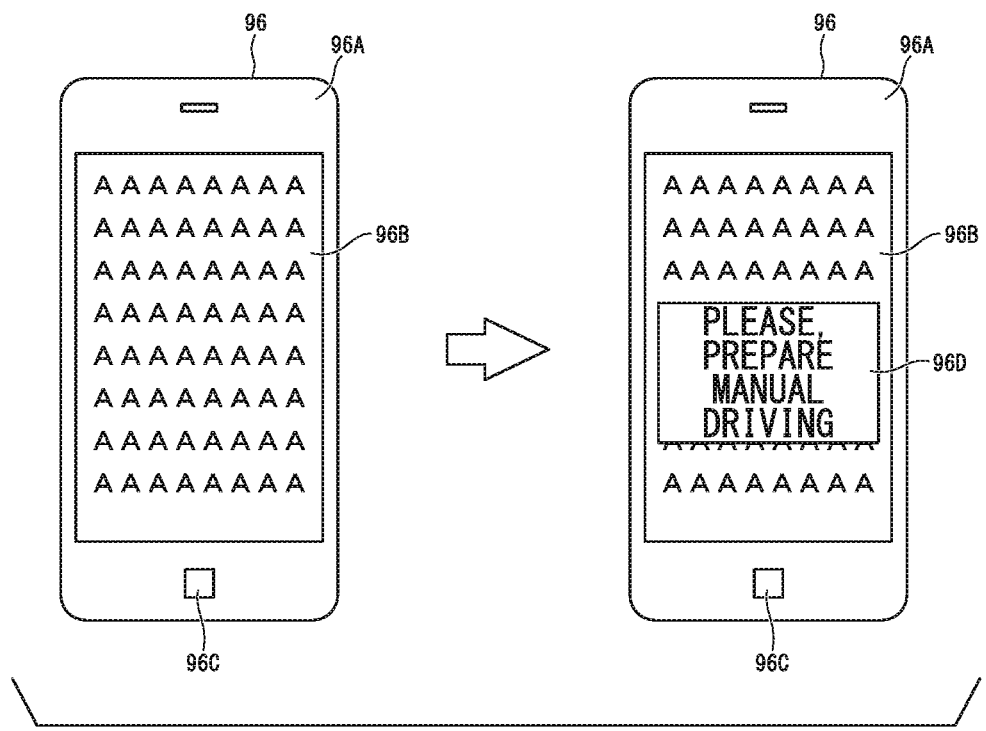
FIG. 16 is a view illustrating an example of information display with respect to a communication terminal 96.

FIG. 16 is a view illustrating an example of information display with respect to the communication terminal 96. The communication terminal 96 illustrated in the example of FIG. 16 is provided with a display screen 96B, an operation button 96C, and the like on a front surface 96A. Here, in the first embodiment, in a case where the communication terminal 96 becomes an interface device for which use is permitted along with changing of the mode of the automatic driving, at least one piece of information among the plurality of pieces of information such as the information indicating use by the vehicle occupant P is permitted, the event information, and the handover request is displayed on the display screen 96B as a message screen 96D. In the example of FIG. 16, the message screen 96D corresponding to the handover request is displayed as in FIG. 14 and FIG. 15, but display contents are not limited thereto. The interface control unit 174 may erase the message screen 96D, for example, after passage of a predetermined time, or in a case of displaying the subsequent message. The message screen 96D may be displayed in a flickered manner or a highlighted manner in correspondence with a background color.

Second Embodiment

Next, a second embodiment will be described. In the above-described first embodiment, the HMI control unit 170 restricts use of an interface device in correspondence with a mode of automatic driving that is performed by the automatic driving control unit 120, and allows an interface device for which use is permitted along with changing of the mode of the automatic driving to output information indicating that use is permitted, and the like. However, a case where the vehicle occupant P views an interface device for which use is not permitted or views other objects such as a magazine during automatic driving is also assumed. In the second embodiment, as the non-driving operation system of the HMI 70, a projection device (for example, a projector and the like) that projects something to a vehicle interior of the host vehicle M is provided to display the plurality of pieces of information such as the information indicating that use is permitted, the event information, and the handover request as described in the first embodiment with respect to a visual line target in the visual line direction of the vehicle occupant.

Figure 17:
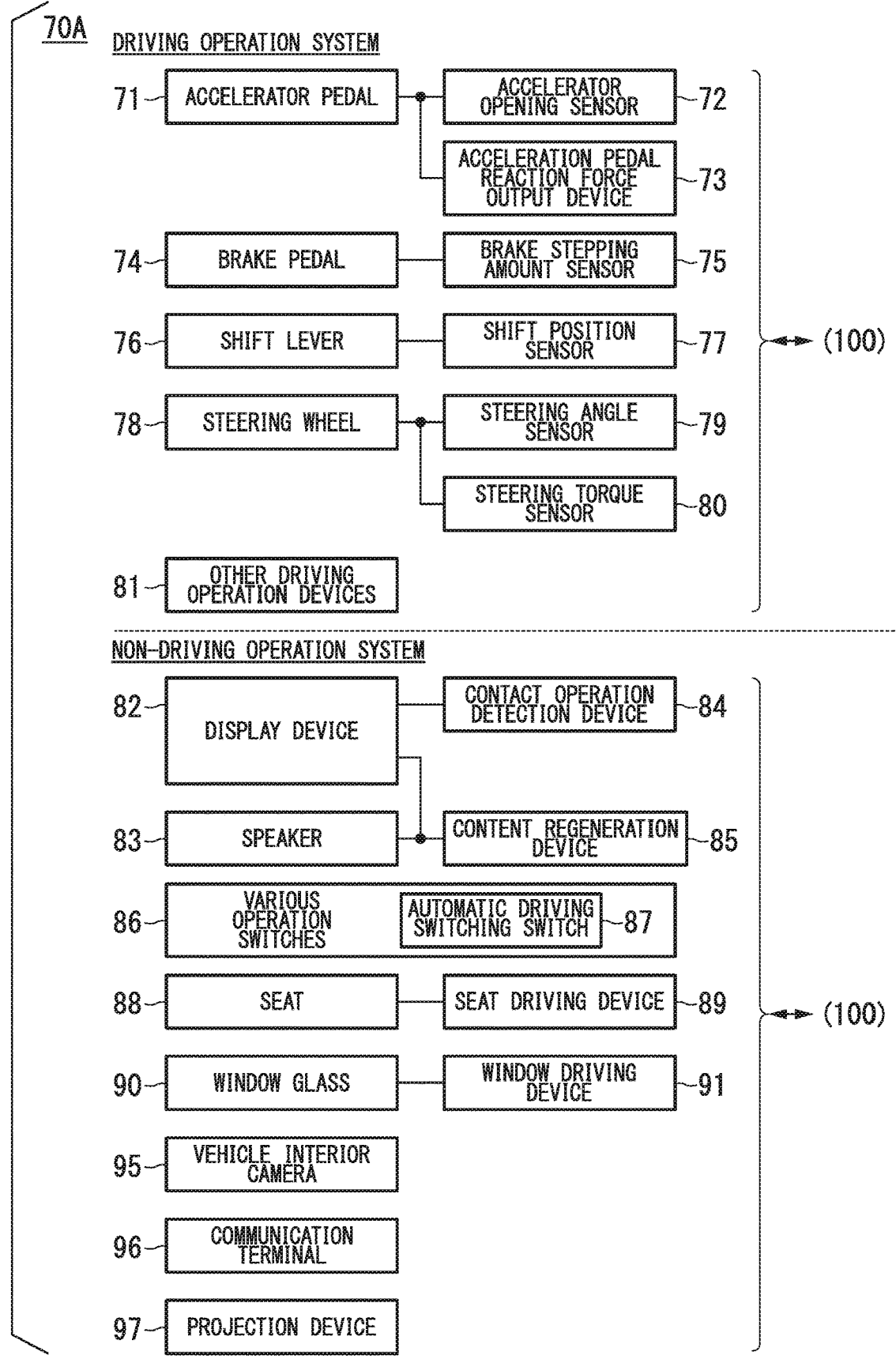
FIG. 17 is a configuration diagram of an HMI 70A according to a second embodiment.
Figure 18:
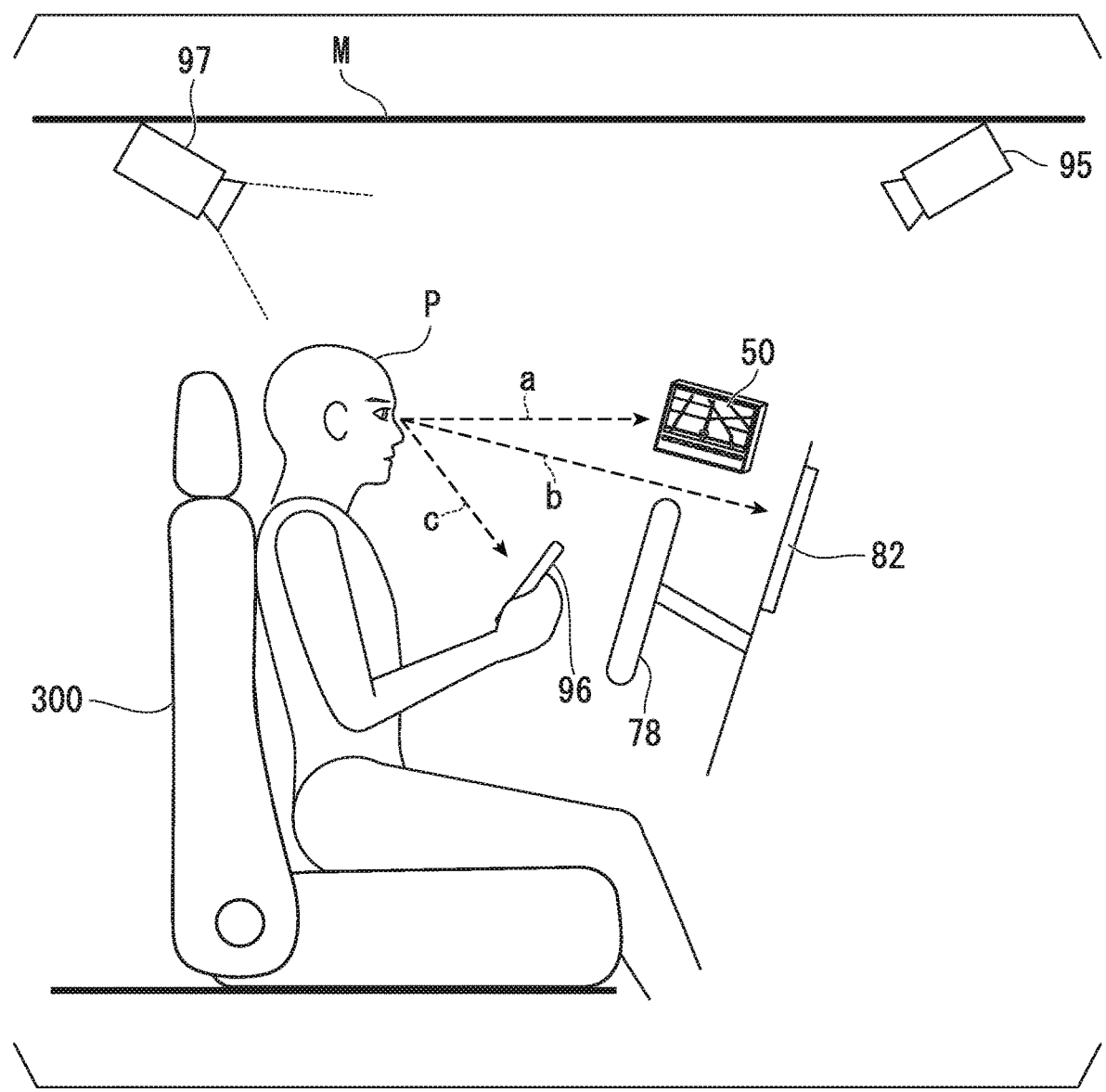
FIG. 18 is a view illustrating an installation example of a projection device 97 in the host vehicle M.

FIG. 17 is a configuration diagram of an HMI 70A according to the second embodiment. In addition, FIG. 18 is a view illustrating an installation example of a projection device 97 inside the host vehicle M. As illustrated in FIG. 17, in the HMI 70A, the projection device (projection unit) 97 is further provided in the non-driving operation system in comparison to the HMI 70 according to the first embodiment. Accordingly, in the following description, description will be given of the projection device 97, and description of other configurations and the like will be omitted. In addition, the HMI 70A according to the second embodiment substitutes for the HMI 70 in the functional configuration diagram with a focus on the vehicle control system 100 illustrated in FIG. 2. In addition, in the second embodiment, the mode-specific operation availability information 188 illustrated in the storage unit 180 of FIG. 2 may not be provided.

The projection device 97 is provided on the ceiling and the like of the host vehicle M illustrated in FIG. 18. The projection device 97 acquires a projection direction and a projection image from the above-described interface control unit 174, and performs image irradiation with respect to the projection direction that is acquired.

A configuration of the HMI control unit 170 according to the second embodiment includes the availability determination unit 172, the interface control unit 174, and the visual line detection unit 176 as in the first embodiment. In the following description, description will be given of processing contents different from the first embodiment, and description of the same processing contents will be omitted.

In the second embodiment, the interface control unit 174 projects information related to an interface device desired to be gazed by a vehicle occupant, and the like with respect to the visual line direction of the vehicle occupant, which is detected by the visual line detection unit 176, from the projection device 97. For example, the interface control unit 174 acquires mode information obtained from the automatic driving control unit 120, and determines whether or not the driving mode is a driving mode in which a driving state of the host vehicle is given in notification by the projection device 97 during the automatic driving from the acquired mode information. For example, in a case of the manual driving mode, when any image is projected in the visual line direction, driving is obstructed. According to this, for example, in the first mode or the second mode of the automatic driving mode, the interface control unit 174 determines the driving mode of the host vehicle as a target in which notification is given.

For example, in a case where a driving mode acquired form the automatic driving control unit 120 is a target in which a driving state of the host vehicle is given in notification during the automatic driving, the interface control unit 174 projects information of an interface device for which restriction of use and the like is mitigated or released to a visual line target in a visual line direction by the projection device 97 on the basis of the visual line direction detected by the visual line detection unit 176. For example, the interface control unit 174 can project information indicating that an interface device for which use by a vehicle occupant is permitted along with changing of the driving mode by the automatic driving control unit 120 is which interface device (interface device desired to be gazed by the vehicle occupant) in a visual line direction of the vehicle occupant. According to this, the vehicle occupant can easily understand the information of the interface device for which an operation is available.

In addition, the interface control unit 174 may project the event, the handover request, and the like in the automatic driving to the visual line target as in the first embodiment. As illustrated in FIG. 18, the above-described various kinds of information (projection images) can be projected to the front surface of the navigation device 50, the front surface of the display device 82, or the front surface of the communication terminal 96 as the projection target, and the various kinds of information can also be projected to a front surface of the steering wheel 78.

In addition, even in a case where the visual line target is not the interface device of the HMI 70 and is a magazine or another vehicle occupant in conversation, the interface control unit 174 can project the above-described various kinds of information by the projection device 97. In addition, the interface control unit 174 acquires information of a projection target from an image captured by the vehicle interior camera 95, and sets at least one among a color, a size, and movement of an image that is to be projected by the projection device 97 on the basis of the target that is acquired. According to this, it is possible to perform display with a color or a size which is easily visually recognized by the vehicle occupant in correspondence with a background color of a projection region. In addition, when the image is allowed to move, it is possible to allow the vehicle occupant to easily notice the image. In addition, the interface control unit 174 can project information indicating that an interface device for which use by the vehicle occupant is permitted along with changing of the driving mode is which interface device by the automatic driving control unit 120 in a visual line direction of the vehicle occupant.

Figure 19:
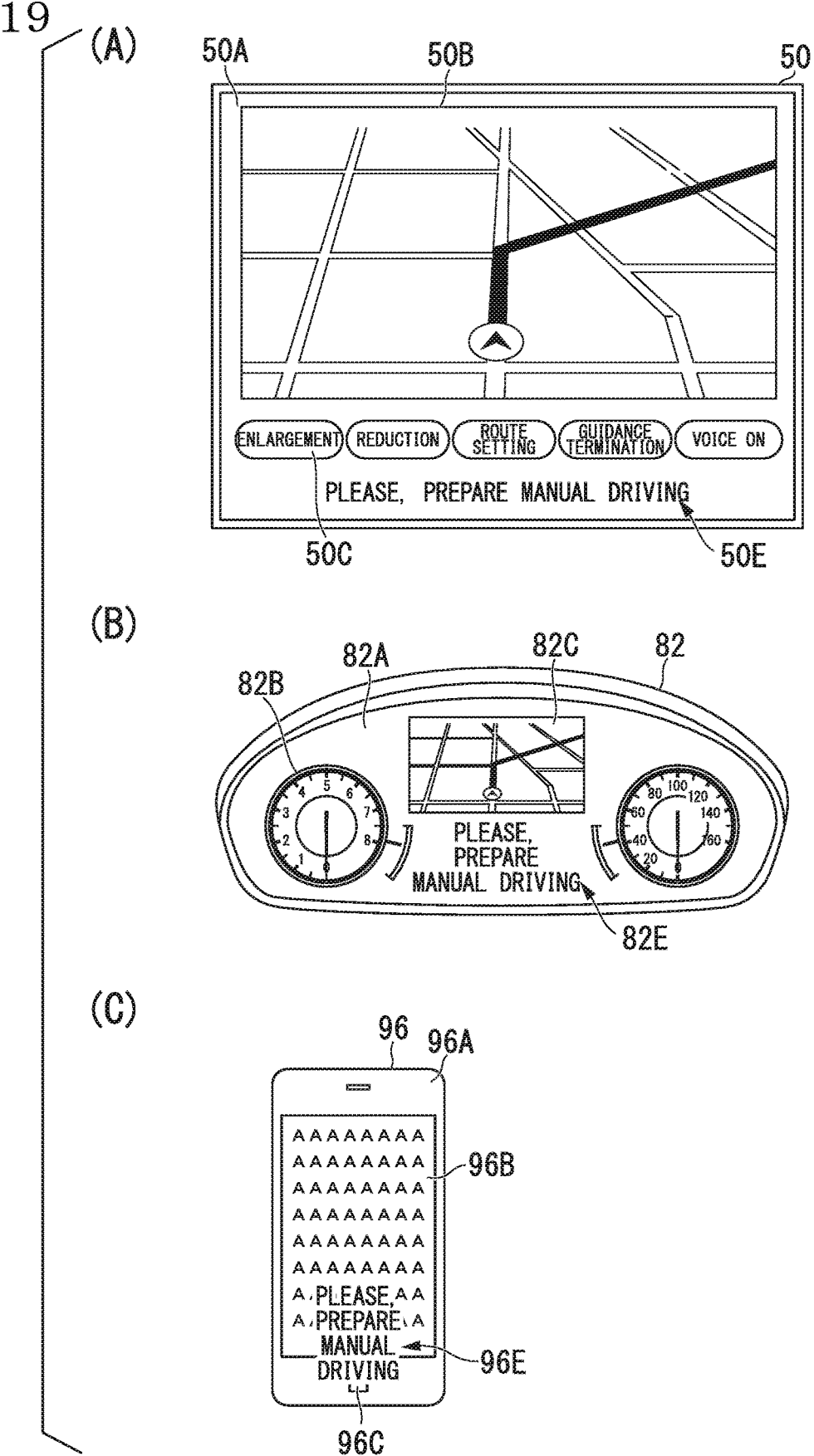
FIG. 19 is a view illustrating an example of a projection aspect by the projection device 97.

FIG. 19 is a view illustrating a projection aspect by the projection device 97. FIG. 19(A) to FIG. 19(C) illustrate examples in which information (projection image) is projected from the projection device 97 with respect to the navigation device 50, the display device 82, and the communication terminal 96. In the example in FIG. 20(A), an image 50E projected to the front surface 50A of the navigation device 50 from the projection device 97 is displayed. The interface control unit 174 may display the image 50E with a color that is visually recognized by the vehicle occupant P in correspondence with a color of the front surface in a highlighted manner. The image 50E may be displayed in a flickered manner or in a manner having movement such as shaking in a predetermined cycle.

In addition, similarly, in the example of FIG. 19(B), an image 82E, which is projected from the projection device 97, is displayed on the front surface 82A of the display device 82. In addition, in the example of FIG. 19(C), an image 96E is projected to the front surface 96A of the communication terminal 96. In addition, a projection target of the projection device 97 is not limited to the navigation device 50, the display device 82, and the communication terminal 96, and examples of the projection target include a magazine that is being read by the vehicle occupant P, or a face or a body of another vehicle occupant (a target who is in conversation in the host vehicle M) who is not seated on the seat 88 for driver's seat. As described above, according to the second embodiment, information related to the automatic driving is projected with respect to a visual line target of the vehicle occupant P, and thus the vehicle occupant P can rapidly understand information related to the automatic driving.

<Processing Flow>

Hereinafter, a flow of processing by the vehicle control system 100 according to this embodiment will be described. In addition, in the following description, description will be given of a flow of HMI control processing related to notification to a vehicle occupant, which is mainly performed by the HMI control unit 170, among various kinds of processing in the vehicle control system 100.

First Example

Figure 20:
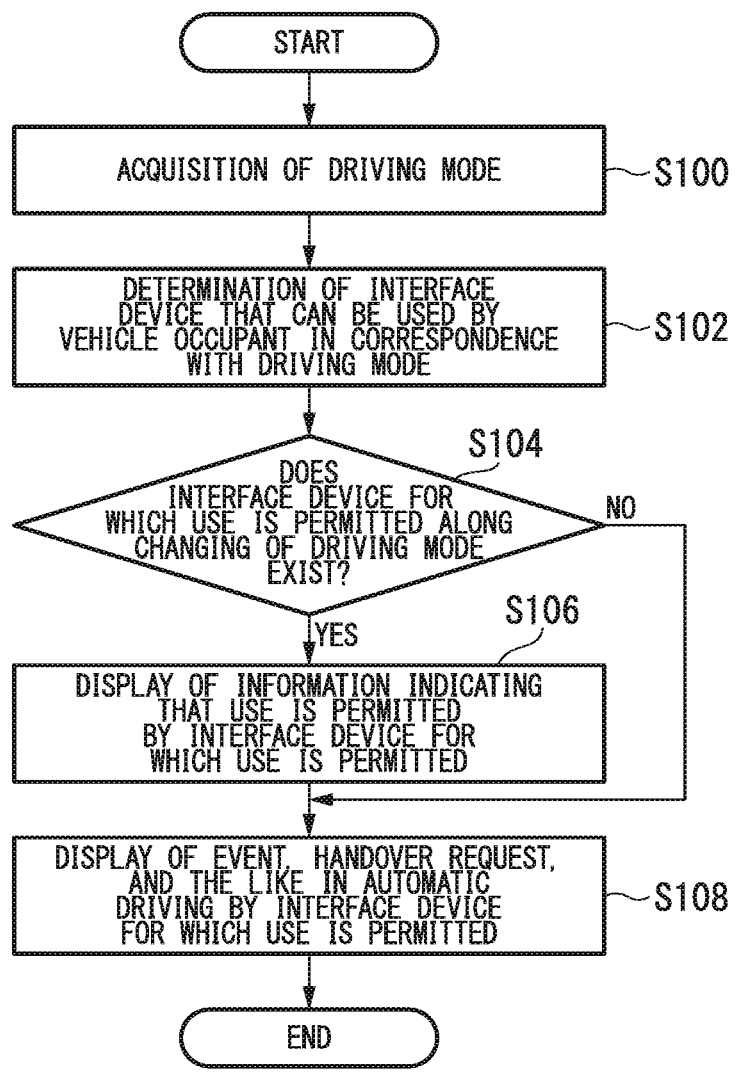
FIG. 20 is a flowchart illustrating a first example of HMI control processing.

FIG. 20 is a flowchart illustrating a first example of the HMI control processing. In the example of FIG. 20, the availability determination unit 172 acquires information related to a driving mode of the host vehicle M from the automatic driving control unit 120 (step S100), and determines an interface device that can be used by a vehicle occupant in correspondence with the driving mode that is acquired (step S102).

Next, the interface control unit 174 determines whether or not an interface device for which use by the vehicle occupant is permitted along with changing of the driving mode exists on the basis of a determination result of the availability determination unit 172 (step S104). In a case where an interface device for which use is permitted exist, the interface control unit 174 allows the interface device for which use is permitted to displays information indicating that use is permitted (step S106). As contents displayed in the processing in step S106, for example, a message such as "a driving mode is switched to an automatic driving mode, and an operation is possible" is displayed, but display contents are not limited thereto.

Next, the interface control unit 174 allows the interface device for which use is permitted to display the event, the handover request, and the like in the automatic driving (step S108). As contents displayed in the processing in step S108, for example, a message such as "a lane changing event is being performed" and "please, prepare manual driving" is displayed, but display contents are not limited thereto. In addition, in the processing in step S104, even in a case where an interface device for which use is permitted along with changing of the driving mode does not exist, the interface control unit 174 may allow an interface device for which use is permitted already to display the event or the handover request in the automatic driving, and the like.

Second Example

Figure 21:
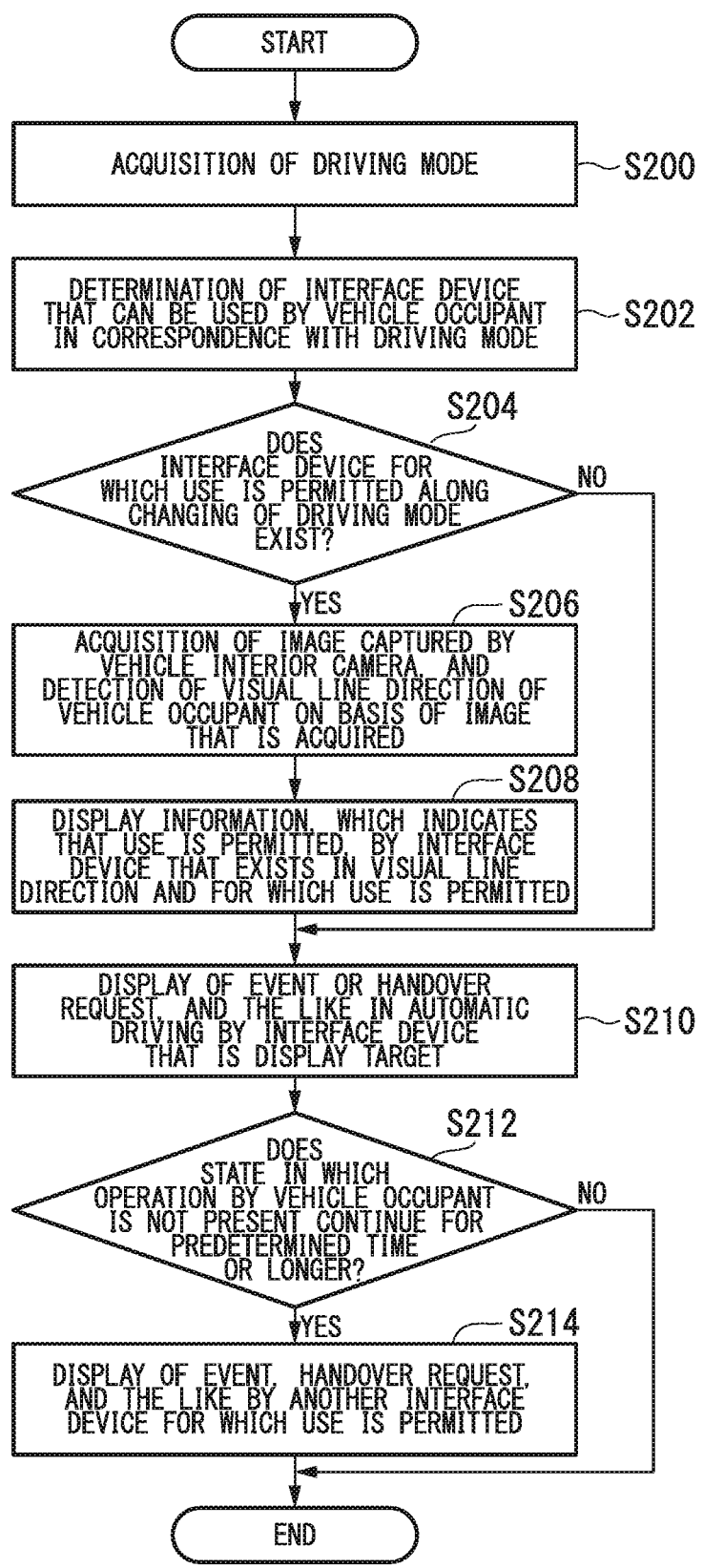
FIG. 21 is a flowchart illustrating a second example of the HMI control processing.

FIG. 21 is a flowchart illustrating a second example of the HMI control processing. In addition, processing in step S200 to processing in step S204 in FIG. 21 are the same as in steps S100 to S104, and thus detailed description thereof will be omitted.

In processing in step S204, an image captured by the vehicle interior camera 95 is acquired, and a visual line direction of a vehicle occupant is detected on the basis of the image that is acquired (step S206). Next, the interface control unit 174 allows an interface device, which exists in the visual line direction and for which use is permitted, to display information indicating that use is permitted (step S208). Next, the interface control unit 174 allows the interface device, which is a display target, to display the event, the handover request, and the like in the automatic driving (step S210). In the processing in step S204, in a case where an interface device for which use is permitted along with changing of the driving mode does not exist, the interface control unit 174 may allow an interface device that is a display target for which use is permitted already to display the event or the handover request in the automatic driving, and the like.

Next, after performing display processing in step S210, the interface control unit 174 determines whether or not a state in which an operation by a vehicle occupant is not present continues for a predetermined time or longer (step S212). In a case where the state in which an operation by the vehicle occupant is not present continues for the predetermined time or longer, the interface control unit 174 allows another interface device for which use is permitted to display the event, the handover request, and the like (step S214). According to this, for example, in a case where at least one operation among a steering operation, an accelerator operation, and a brake operation by the vehicle occupant is necessary due to the handover request and the like, the vehicle occupant can be reliably notified of information indicating the contents. In addition, the interface control unit 174 may perform control of making the vehicle occupant be aware of notification with a sound, a vibration to a seat on which the vehicle occupant is seated, and the like in addition to the display.

Third Example

Figure 22:
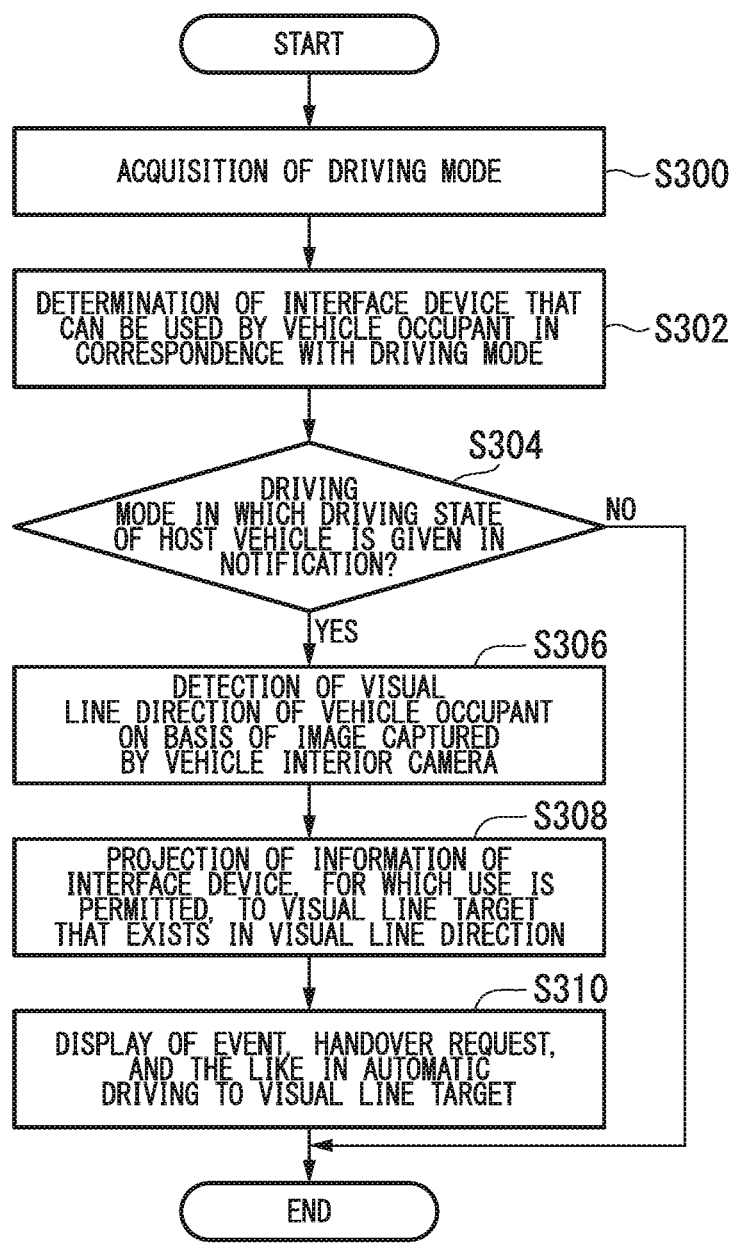
FIG. 22 is a flowchart illustrating a third example of the HMI control processing.

FIG. 22 is a flowchart illustrating a third example of the HMI control processing. In addition, processing in step S300 to processing in step S302 in FIG. 22 are the same as in steps S100 to S102 in the above-described first example, and thus detailed description thereof will be omitted.

After performing the process in step S302, the interface control unit 174 determines whether or not the driving mode is a driving mode in which a driving state of the host vehicle is given in notification (step S304). In a case of the driving mode in which the driving state of the host vehicle M is given in notification, the interface control unit 174 detects a visual line direction of the vehicle occupant on the basis of an image captured by the vehicle interior camera (step S306), and projects an information of an interface device for which use is permitted to a visual line target that exists in the visual line direction (step S308). As contents display in the processing in step S308, for example, a message such as "a navigation device can be used" and the like are displayed, but display contents are not limited thereto.

Next, the interface control unit 174 displays the event, the handover request, and the like in the automatic driving on a target (step S310). In addition, in a case of a driving mode in which the driving state of the host vehicle M is not given in notification, the interface control unit 174 does not perform notification with projection. In addition, as an embodiment, parts or the entirety of the above described examples may be combined.

In addition, the embodiment may be expressed as follows.
A vehicle control system including:
an imaging unit that captures a space inside a host vehicle;
a visual line detection unit that detects a visual line of a vehicle occupant on the basis of an image captured by the imaging unit;
a projection unit that projects an image to the space inside the host vehicle; and
an interface control unit that projects information related to an interface device desired to be gazed by the vehicle occupant from the projection unit with respect to the visual direction of the vehicle occupant which is detected by the visual line detection unit.

Hereinbefore, an aspect for carrying out the invention has been described with reference to the embodiments. However, the invention is not limited to the embodiments, and various modifications and substitutions can be made in a range not departing from the gist of the invention.

INDUSTRIAL APPLICABILITY

The invention can be used in an automobile manufacturing industry.

REFERENCE SIGNS LIST

20 Finder
30 Radar
40 Camera
DD Detection device
50 Navigation device
55 Communication device
60 Vehicle sensor
70 HMI
100 Vehicle control system
110 Target lane determination unit
120 Automatic driving control unit
130 Automatic driving mode control unit
140 Host vehicle position recognition unit
142 External field recognition unit
144 Action plan generation unit
146 Trajectory generation unit
146A Travel aspect determination unit
146B Trajectory candidate generation unit
146C Evaluation and selection unit
150 Switching control unit
160 Travel control unit
170 HMI control unit
172 Availability determination unit
174 Interface control unit 176 Visual line detection unit
180 Storage unit
200 Travel drive force output device
210 Steering device
220 Brake device
M Host vehicle

What is claim is:

1. A vehicle control system, comprising:
an automatic driving control unit that automatically controls at least one of acceleration/deceleration and steering of a host vehicle, and performs automatic driving control in any one mode among a plurality of modes different in the degree of automatic driving;
an interface device that outputs information;
an interface control unit that restricts output of the information in the interface device in correspondence with a mode of automatic driving that is performed by the automatic driving control unit;
an imaging unit that captures images of a space inside the host vehicle;
a visual line detection unit that detects a visual line direction of the occupant on the basis of the image captured by the imaging unit; and
a projection unit that projects projection images to the space inside the host vehicle,
wherein in a case where information to be given in notification from the host vehicle to an occupant of the host vehicle is generated, and in a case that a visual line target in the visual line direction of the occupant detected by the visual line detection unit is the interface device, the interface control unit allows the interface device, for which the restriction for prevention of driver distraction is mitigated or released along with changing of the mode of the automatic driving, to output the information to be given in notification, and
wherein in a case that the visual line target in the visual line direction of the occupant detected by the visual line detection unit is not the interface device, the interface control unit acquires information of the visual line target to which the information to be given in notification is projected from an image captured by the imaging unit, sets at least one among a color, a size, and movement of a projection image to be projected by the projection unit based on a size and a color of the visual line target that is acquired, and causes projection of the set projection image on the visual line target by the projection unit.

2. The vehicle control system according to claim 1,
wherein the interface control unit allows the interface device to output information indicating that use of the interface device is permitted along with changing of the mode of the automatic driving.

3. The vehicle control system according to claim 1,
wherein the interface control unit restricts use of the interface device in manual driving or in automatic driving in which peripheral monitoring by the occupant is necessary, and releases the restriction in automatic driving in which the peripheral monitoring by the occupant is not necessary.

4. The vehicle control system according to claim 1,
wherein the interface control unit allows the interface device to output information including one or both of an event related to acceleration/deceleration and/or lane changing of the host vehicle, and a handover request with respect to the occupant of the host vehicle in the automatic driving control unit.

5. The vehicle control system according to claim 1, further comprising:
an imaging unit that captures an image of a space inside the host vehicle; and
a visual line detection unit that detects a visual line direction of the occupant on the basis of the image captured by the imaging unit,
wherein the interface control unit allows an interface device, which exists in the visual line direction of the occupant which is detected by the visual line detection unit, to output information.

6. The vehicle control system according to claim 5,
wherein in a case where an operation from the occupant is not accepted within a predetermined time after allowing the interface device, which exists in the visual line direction of the occupant which is detected by the visual line detection unit, to output the information, the interface control unit allows an interface device other than the interface device allowed to output the information to output the information.

7. The vehicle control system according to claim 1,
wherein the interface device includes at least one among a navigation device, a display device, and a communication terminal.

8. The vehicle control system according to claim 1,
wherein the interface control unit projects information related to an interface device, for which the restriction is mitigated or released along with changing of the mode of the automatic driving that is performed by the automatic driving control unit, from the projection unit with respect to a visual line direction of the occupant which is detected by the visual line detection unit.

9. The vehicle control system according to claim 8,
wherein the interface control unit projects information related to an interface device for which use by the occupant is permitted along with changing of a driving mode by the automatic driving control unit in the visual line direction of the occupant.

10. A vehicle control method that allows an in-vehicle computer to:
automatically control at least one of acceleration/deceleration and steering of a host vehicle, and perform automatic driving control in any one mode among a plurality of modes different in the degree of automatic driving;
allow an interface device to output information;
restrict output of the information in the interface device in correspondence with a mode of automatic driving that is performed by the automatic driving control;
capture an image of a space inside the host vehicle;
detect a visual line direction of the occupant on the basis of the image captured;
project a projection image to the space inside the host vehicle;
in a case where the information to be given in notification from the host vehicle to an occupant of the host vehicle is generated, and in a case that a visual line target in the visual line direction of the occupant detected is the interface device, allow the interface device, for which the restriction for prevention of driver distraction is mitigated or released along with changing of the mode of the automatic driving, to output information to be given in notification; and
in a case that the visual line target in the visual line direction of the occupant detected is not the interface device, acquire information of the visual line target to which the information to be given in notification is projected from an image captured, set at least one among a color, a size, and movement of a projection image to be projected based on a size and a color of the visual line target that is acquired, and cause projection of the set projection image on the visual line target.

11. A non-transitory computer-readable storage medium that stores a vehicle control program to be executed by an onboard computer to perform at least:
- a process of automatically controlling at least one of acceleration/deceleration and steering of a host vehicle, and performing automatic driving control in any one mode among a plurality of modes different in the degree of automatic driving;
- a process of allowing an interface device to output information;
- a process of restricting output of the information in the interface device in correspondence with a mode of automatic driving that is performed by the automatic driving control;
- a process of capturing an image of a space inside the host vehicle;
- a process of detecting a visual line direction of the occupant on the basis of the image captured;
- a process of projecting projection images to the space inside the host vehicle;
- in a case where the information to be given in notification from the host vehicle to an occupant of the host vehicle is generated, and in a case that a visual line target in the visual line direction of the occupant detected is the interface device, a process of allowing the interface device, for which the restriction for prevention of driver distraction is mitigated or released along with changing of the mode of the automatic driving, to output information to be given in notification; and
- in a case that the visual line target in the visual line direction of the occupant detected is not the interface device, acquiring information of the visual line target to which the information to be given in notification is projected from an image captured, setting at least one among a color, a size, and movement of a projection image to be projected based on a size and a color of the visual line target that is acquired, and causing projection of the set projection image on the visual line target.

* * * * *